United States Patent
Zweig et al.

(10) Patent No.: US 9,025,860 B2
(45) Date of Patent: May 5, 2015

(54) THREE-DIMENSIONAL OBJECT BROWSING IN DOCUMENTS

(75) Inventors: Geoffrey G. Zweig, Sammanish, WA (US); Eric J. Stollnitz, Kirkland, WA (US); Richard Szeliski, Bellevue, WA (US); Sudipta Sinha, Redmond, WA (US); Johannes Kopf, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 62 days.

(21) Appl. No.: 13/567,105

(22) Filed: Aug. 6, 2012

(65) Prior Publication Data
US 2014/0037218 A1    Feb. 6, 2014

(51) Int. Cl.
*G06K 9/00* (2006.01)
*G06F 17/30* (2006.01)

(52) U.S. Cl.
CPC ............................... *G06F 17/30268* (2013.01)

(58) Field of Classification Search
USPC .................................. 382/154, 285; 345/419
See application file for complete search history.

(56) References Cited

U.S. PATENT DOCUMENTS

| | | | |
|---|---|---|---|
| 5,432,712 A | 7/1995 | Chan | |
| 6,052,124 A | 4/2000 | Stein et al. | |
| 6,351,572 B1 | 2/2002 | Dufour | |
| 6,526,166 B1 | 2/2003 | Gorman | |
| 7,130,484 B2 | 10/2006 | August | |
| 8,121,350 B2 | 2/2012 | Klefenz | |
| 8,675,049 B2 | 3/2014 | Kopf et al. | |
| 2001/0053284 A1 | 12/2001 | Shin | |
| 2002/0158873 A1 | 10/2002 | Williamson | |
| 2004/0059708 A1 | 3/2004 | Dean et al. | |
| 2004/0196282 A1 | 10/2004 | Oh | |
| 2005/0081161 A1 | 4/2005 | MacInnes et al. | |
| 2006/0005114 A1 | 1/2006 | Williamson et al. | |
| 2006/0023927 A1 | 2/2006 | Zhang et al. | |
| 2006/0120594 A1 | 6/2006 | Kim | |
| 2006/0132482 A1 | 6/2006 | Oh | |
| 2007/0076016 A1 | 4/2007 | Agarwala | |
| 2007/0211149 A1 | 9/2007 | Burtnyk et al. | |

(Continued)

FOREIGN PATENT DOCUMENTS

| AU | 2010260256 | 6/2010 |
|---|---|---|
| BR | PI1010700-2 | 6/2010 |

(Continued)

OTHER PUBLICATIONS

"International Search Report for PCT Patent Application No. PCT/US2013/053323", Mailed Date: Oct. 10, 2013, Filed Date: Aug. 2013, 4 Pages.

(Continued)

*Primary Examiner* — John Strege
(74) *Attorney, Agent, or Firm* — Judy Yee; Micky Minhas

(57) ABSTRACT

A document that includes a representation of a two-dimensional (2-D) image may be obtained. A selection indicator indicating a selection of at least a portion of the 2-D image may be obtained. A match correspondence may be determined between the selected portion of the 2-D image and a three-dimensional (3-D) image object stored in an object database, the match correspondence based on a web crawler analysis result. A 3-D rendering of the 3-D image object that corresponds to the selected portion of the 2-D image may be initiated.

20 Claims, 19 Drawing Sheets

(56) References Cited

U.S. PATENT DOCUMENTS

| | | |
|---|---|---|
| 2007/0236561 A1 | 10/2007 | Anai et al. |
| 2008/0071559 A1 | 3/2008 | Arrasvuori |
| 2008/0137989 A1 | 6/2008 | Ng |
| 2008/0144968 A1 | 6/2008 | Cohen et al. |
| 2008/0247668 A1 | 10/2008 | Li |
| 2008/0285843 A1 | 11/2008 | Lim |
| 2009/0244062 A1 | 10/2009 | Steedly et al. |
| 2009/0254820 A1 | 10/2009 | Farouki et al. |
| 2009/0259976 A1 | 10/2009 | Varadhan et al. |
| 2010/0045703 A1 | 2/2010 | Kornmann et al. |
| 2010/0045816 A1 | 2/2010 | Rhoads |
| 2010/0080411 A1 | 4/2010 | Deliyannis |
| 2010/0085383 A1 | 4/2010 | Cohen et al. |
| 2010/0201682 A1 | 8/2010 | Quan et al. |
| 2010/0315412 A1 | 12/2010 | Sinha et al. |
| 2011/0035289 A1 | 2/2011 | King et al. |
| 2011/0061011 A1 | 3/2011 | Hoguet |
| 2011/0244919 A1 | 10/2011 | Aller et al. |
| 2012/0314040 A1 | 12/2012 | Kopf et al. |

FOREIGN PATENT DOCUMENTS

| | | |
|---|---|---|
| CA | 2760973 | 6/2010 |
| CN | 201080026636.3 | 6/2010 |
| EP | 10790021.9 | 6/2010 |
| HK | 12104353.9 | 5/2012 |
| IN | 9886/DELNP/ | 6/2010 |
| JP | 2012-516183 | 6/2010 |
| KR | 10-2011-7029924 | 6/2010 |
| SG | 201108052-0 | 6/2010 |
| WO | 03042925 A1 | 5/2003 |
| WO | 2008156450 | 12/2008 |
| WO | 2010/038594 | 6/2010 |
| WO | 2014025627 | 2/2014 |

OTHER PUBLICATIONS

Nieuwenhuisen, et al., "Motion planning for camera movements", Retrieved at <<http://ieeexplore.ieee.org/stamp/stamp.jsp?tp=&arnumber=1308871>>, Proceedings of IEEE International Conference on Robotics & Automation, Apr. 26-May 1, 2004, pp. 3870-3876.

Smith, et al., "Light field video stabilization", Retrieved at <<http://ieeexplore.ieee.org/stamp/stamp.jsp?tp=&arnumber=5459270>>, Proceedings of 12th IEEE Internationa Conference on Computer Vision, Sep. 29-Oct. 2, 2009, pp. 341-348.

Marchand, et al., "Image-based virtual camera motion strategies", Retrieved at <<http://www.irisa.fr/lagadic/pdf/2000_gi_marchand.pdf>>, Proceedings of Graphic Interface Conference, May 2000, pp. 8.

Goemans, et al., "Automatic Generation of Camera Motion to Track a Moving Guide", Retrieved at <<http://citeseerx.ist.psu.edu/viewdoc/download?doi=10.1.1.2.1792&rep=rep1&type=pdf>>, Proceedings of International Workshop on the Algorithimic Foundations of Robotics, Jul. 20, 2004, pp. 1-17.

Santos, et al., "Camera control based on rigid body dynamics for virtual environments", Retrieved at http://ieeexplore.ieee.org/stamp/stamp.jsp?tp=&arnumber=5068922>>, International Conference on Virtual Environments, Human-Computer Interfaces and Measurements Systems, May 11-13, 2009, pp. 6.

Office Action mailed Jul. 16, 2013 for U.S. Appl. No. 13/156,975, filed Jun. 9, 2011, 15 pages.

Response filed Oct. 7, 2013, in response to Office Action mailed Jul. 16, 2013 for U.S. Appl. No. 13/156,975, filed Jun. 9, 2011, 9 pages.

Notice of Allowance mailed Oct. 25, 2013 for U.S. Appl. No. 13/156,975, filed Jun. 9, 2011, 10 pages.

Uppalapati, et al., "3D VQI: 3D Visual Query Interface", Retrieved May 7, 2012 at <<http://i3dea.asu.edu/data/docs_pubs/3D_VQI_II_Report.pdf>>, Proceedings of Sixth International Conference on Information Technology: New Generations, ITNG 2009, Las Vegas, Nevada, Apr. 27, 2009, 9 pages.

Min, Patrick, "A 3D Model Search Engine", Retrieved May 8, 2012 at <<http://www.cs.princeton.edu/~min/publications/min04.pdf>>, Dissertation, Princeton University, Jan. 2004, 139 pages.

Min, et al., "Early Experiences with a 3D Model Search Engine", Retrieved May 7, 2012 at <<http://www.cs.jhu.edu/~misha/MyPapers/WEB3D.pdf>>, Proceedings of the Eighth International Conference on 3D Web Technology (Web3D '03), Symp., Saint Malo, France, 2003, 12 pages.

Yang, et al., "Content-Based 3-D Model Retrieval: A Survey", Retrieved May 7, 2012 at <<http://ieeexplore.ieee.org/stamp/stamp.jsp?tp=&arnumber=4344001<>, IEEE Transactions on Systems, Man, and Cybernetics—Part C: Applications and Reviews, vol. 37, No. 6, Nov. 2007, pp. 1081-1098.

Kopf, et al., "Navigation Model to Render Centered Objects Using Images," U.S. Appl. No. 13/156,975, filed Jul. 9, 2011, 32 pages.

Snavely, et al., "Photo Tourism: Exploring Photo Collections in 3D," Retrieved Jul. 10, 2012 at <<http://phototour.cs.washington.edu/Photo_Tourism.pdf>>, ACM Transactions on Graphics (SIGGRAPH Proceedings), vol. 25, No. 3, 2006, pp. 835-846.

"What is Photosynth?", Retrieved Jul. 10, 2012 at <<http://photosynth.net/about.aspx/>>, 2 pages.

Baillard, C., et al., "A plane-sweep strategy for the 3d reconstruction of buildings from multiple images," In ISPRS Journal of Photogrammetry and Remote Sensing, 2000, pp. 56-62.

Baker, S. et al., "A layered approach to stereo reconstruction," Conference on Computer Vision and Pattern Recognition (CVPR), 0:434,1998.

Bartoli, A., "A random sampling strategy for piecewise planar scene segmentation," Computer Vision Image Understanding, 105(1 ), 2007, pp. 42-59.

Birchfield, S., et al., "Multiway cut for stereo and motion with slanted surfaces," In ICCV, 1999, pp. 489-495.

Boykov, Y., et al., "Fast approximate energy minimization via graph cuts," In ICCV (1), 1999, pp. 377-384.

Chen, H., et al., "Robust regression for data with multiple structures," In 2001 IEEE Conference on Computer Vision and Pattern Recognition, vol. I, 2001, pp. 1069-1075.

Collins, R.T., "A space-sweep approach to true multi-image matching," In CVPR, 1996, pp. 358-363.

Cornelis, N., et al., "Fast compact city modeling for navigation previsualization," CVPR, 2, 2006, pp. 1339-1344.

Debevec, P., et al., "Efficient view dependent image-based rendering with projective texture mapping," In 9th Eurographics Rendering Workshop, 1998, pp. 105-116.

Fischler, M. A., et al., "Random sample consensus: a paradigm for model fitting with applications to image analysis and automated cartography," Commun. ACM, 24(6), 1981, pp. 381-395.

Furukawa, Y., et al., "Manhattan-world Stereo," <<http://research.microsoft.com/pubs/80495/Furukawa-CVPR09.pdf>>, Microsoft Corporation, Jun. 1, 2009.

Furukawa, Y., et al., "Accurate, dense, and robust multiview stereopsis," In CVPR, 2007, pp. 1-8.

Gallup , D., et al., Real-time plane-sweeping stereo with multiple sweeping directions, CVPR, 2007, pp. 1-8.

Goesele , M., et al., "Multi-view stereo for community photo collections," In ICCV, 2007.

Habbecke M., et al., "Iterative multi-view plane fitting," In In VMV06, 2006, pp. 73-80.

Hoiem , D., et al., "Automatic photo pop-up," In SIGGRAPH, Aug. 2005.

Kolmogorov, V. , et al., "Multi-camera scene reconstruction via graph cuts," In ECCV, 2002, pp. 82-96.

Lhuillier , M. , et al., "Edge-constrained joint view triangulation for image interpolation," In CVPR, 2000, pp. 218-224.

Schindler, G. , et al., "Atlanta world: An expectation maximization framework for simultaneous low-level edge grouping and camera calibration in complex man-made environments," In CVPR (1), 2004, pp. 203-209.

Schindler, K. , et al., "MDL selection for piecewise planar reconstruction," in Proc. of 26th Workshop AAPR, 2002, pp. 13-20.

Schmid, C., et al., "Automatic line matching across views," In CVPR, 1997, pp. 666-671.

(56) References Cited

OTHER PUBLICATIONS

Seitz, S., et al., "A comparison and evaluation of multi-view stereo reconstruction algorithms," In CVPR, vol. 1, New York, NY, Jun. 2006, pp. 519-526.
Snavely, N., et al., "Photo tourism: exploring photo collections in 3d," ACM Trans. on Graphics (SIGGRAPH), 25(3), 2006, pp. 835-846.
Szeliski, R., et al., "Stereo matching with transparency and matting," IJCV, 32(1), Aug. 1999, pp. 45-61.
Zebedin, L., et al., "Fusion of feature- and area-based information for urban buildings modeling from aerial imagery," In ECCV, 2008, pp. 873-886.
Boykov, Y., et al., "An experimental comparison of min-cut/max-flow algorithms for energy minimization in vision," PAMI, 26, 2004, pp. 1124-1137.
Taylor, C. J., "Surface reconstruction from feature based stereo," CVPR, 1, 2003.
Comaniciu, D. et al., "Mean shift: A robust approach toward feature space analysis," PAMI, 24(5), 2002, pp. 603-619.
Coorg, S., et al., "Extracting textured vertical facades from controlled close-range imagery," in CVPR, 1999, pp. 625-632.
Coughlan, J. M., et al., "Manhattan world: Compass direction from a single image by bayesian inference," In ICCV,1999, pp. 941-947.
Kazhdan M., et al., "Poisson surface reconstruction," In Symp. Geom. Proc., 2006.
Kolmogorov, V., et al., "What energy functions can be minimized via graph cuts?" PAMI, 26(2), 2004, pp. 147-159.
Kutulakos, K., et al., "A theory of shape by space carving," IJCV, 38(3), 2000, pp. 199-218.
Scharstein, D., et al., "A taxonomy and evaluation of dense two-frame stereo correspondence algorithms," IJCV 47 (1-3),2002, pp. 7-42.
Seitz, S., et al., "Photorealistic scene reconstruction by voxel coloring," In CVPR,1997, pp. 1067-1073.
Tao, H., et al., "A global matching framework for stereo computation," In ICCV, 2001, pp. 532-539.
Wang, J. Y. A., et al., "Representing moving images with layers," IEEE Transactions on Image Processing, 3(5), 1994, pp. 625-638.
Werner, T., et al., "New techniques for automated architectural reconstruction from photographs," In ECCV, 2002, pp. 541-555.
Fraundorfer, F., et al., "Piecewise planar scene reconstruction from sparse correspondences," Image Vision Computing, 24(4), 2006, pp. 395-406.
Quan, L., et al.,"Image-Based Modeling by Joint Segmentation" The Department of Computer Science and Engineering, The Hong Kong University of Science and Technology, International Journal of Computer Vision 75(1), 135-150, 2007, Received May 10, 2006; Accepted Feb. 14, 2007, First online version published in Mar. 2007, 16 pages.
Andersen, V., vedrana@itu.dk Smoothing 3D Meshes using Markov Random Fields, Master's thesis, Supervisors: Mads Nielsen, Professor, DIKU and Henrik Aanaes, Associate Professor, DTU, ITU, Sep. 2006-Apr. 2007, 105 pages.
Chehata, N, "A graph cut optimization guided by 3D-features for surface height recovery," ISPRS Journal of Photogrammetry and Remote Sensing 64 (2009) 193-203, www.elsevier.com/locate/isprsjprs, Published by Elsevier BV 2008, 11 pages.
Furukawa, Y., "Patch-Based Multi-View Stereo Software" furukawa-at-cs.washington.edu, last update Aug. 25, 2008, http://www.cs.washington.edu/homes/furukawa/research/pmvs/home.html Jun. 16, 2009, 2 pages.
"Photosynth," http://photosynth.nellDefaull.aspx, Microsoft Corporation, Apr. 7, 2009, 1 page.
Snavely, N., Bundler: Structure from Motion for Unordered Image Collections, Latest version: 0.3, Release Date: May 4, 2009, 3 pages.
Sugimoto, S., Department of Mechanical and Control Engineering, Graduate School of Science and Engineering, Tokyo Institute of Technology, A Direct and Efficient Method for Piecewise-Planar Surface Reconstruction from Stereo Images, Authorized licensed use limited to: IEEE Xplore, downloaded on Apr. 7, 2009 at 01:17 from IEEE Xplore, 8 pages.
Zitnick, C. L., et al., "High-quality video view interpolation using a layered representation," Interactive Visual Media Group, Microsoft Research, Redmond, WA, permissions@acm.org 2004, 9 pages.
CN Office Action, mailed Jul. 24, 2013, in CN Application No. 201080026636, 9 pages.
Seitz, Steven M., et al "A Comparison and Evaluation of Mulit-view Stereo Reconstruction Algorithms", Proceedings of the 2006 IEEE Computer Society Conference on Computer Vision and Pattern Recognition (CVPR'06), IEEE (2006), 8 pages.
Boykov, Y., et al. "Fast Approximate Energy Minimization via Graph Cuts", IEEE Transactions on Pattern Analysis and Machine Intelligence, vol. 23, No. 11 (Nov. 2001), 18 pages.
Australian Office Action dated Mar. 27, 2014 re Application No. 2010260256, 2 pages.
Chinese Office Action dated Jan. 21, 2014 re Application No. 201080026636.3. 3 pages.
Chinese Notice of Allowance dated May 8, 2014 re Application No. 201080026636.3. 1 page.
PCT/US/2010/038594 International Search Report,.mailed Feb. 8, 2011, 9 pages.
Office Action mailed Jun. 20, 2012 for U.S. Appl. No. 12/484,909, filed Jun. 15, 2009, 17 pages.
Micusik et al. "Multi-view Superpixel Stereo in Man-Made Environments," Technical Report GMU-CS-TR-2008-1, Published 2008, 12 pages.
Liu, J., et al., "Plane-Based Optimization for 3D Object Reconstruction from Single Line Drawings," IEEE Transactions on Pattern Analysis and Machine Intelligence, vol. 30, No. 2, Feb. 2008, pp. 315-327.
Response filed Sep. 20, 2012, in response to Office Action mailed Jun. 20, 2012 for U.S. Appl. No. 12/484,909, filed Jun. 15, 2009, 16 pages.
Office Action mailed Oct. 18, 2012 for U.S. Appl. No. 12/484,909, filed Jun. 15, 2009, 17 pages.
Response filed Jan. 16, 2013, in response to Office Action mailed Oct. 18, 2012 for U.S. Appl. No. 12/484,909, filed Jun. 15, 2009, 16 pages.
Office Action mailed Apr. 1, 2013 for U.S. Appl. No. 12/484,909, filed Jun. 15, 2009, 13 pages.
Barinova, et al., "Fast automatic single-view 3-d reconstruction of urban scenes," ECCV (2) 2008, pp. 100-113.
Pollefeys et al. "Detailed Real-Time Urban 3D Reconstruction From Video," International Journal of Computer Vision, vol. 78 Issue 2-3, Jul. 2008, 43 pages.
Cornelis et al. "3D Urban Scene Modeling Integrating Recognition and Reconstruction," International Journal of Computer Vision, vol. 78 (2008), pp. 121-141.
Response filed Jul. 1, 2013, in response to Office Action mailed Apr. 1, 2013 for U.S. Appl. No. 12/484,909, filed Jun. 15, 2009, 14 pages.
Office Action mailed Jul. 23, 2013 for U.S. Appl. No. 12/484,909, filed Jun. 15, 2009, 15 pages.
Response filed Oct. 23, 2013, in response to Office Action mailed Jul. 23, 2013 for U.S. Appl. No. 12/484,909, filed Jun. 15, 2009, 15 pages.
Notice of Allowance mailed Nov. 20, 2013 for U.S. Appl. No. 12/484,909, filed Jun. 15, 2009, 11 pages.
Office Action mailed Feb. 21, 2014 for U.S. Appl. No. 12/484,909, filed Jun. 15, 2009, 15 pages.
Response filed May 16, 2014, in response to Office Action mailed Feb. 21, 2014 for U.S. Appl. No. 12/484,909, filed Jun. 15, 2009, 16 pages.
Notice of Allowance mailed Jun. 9, 2014 for U.S. Appl. No. 12/484,909, filed Jun. 15, 2009, 8 pages.
Notice of Allowance mailed Sep. 14, 2014 for U.S. Appl. No. 12/484,909, filed Jun. 15, 2009, 5 pages.

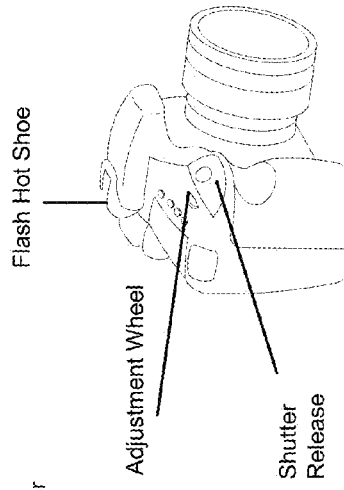
FIG. 3c
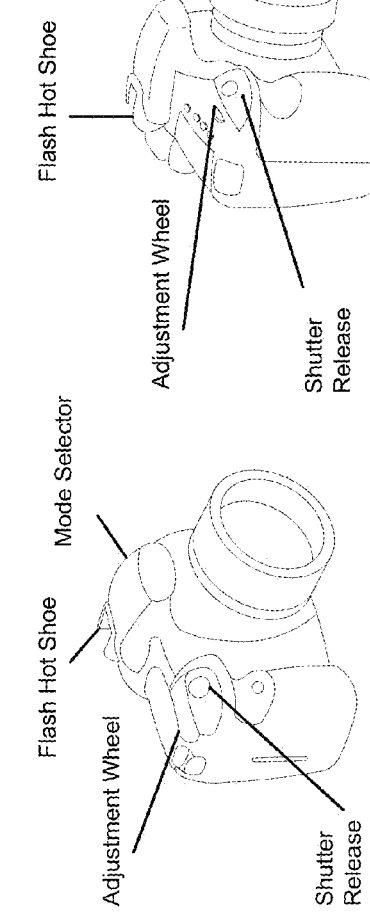
FIG. 3d
FIG. 3e
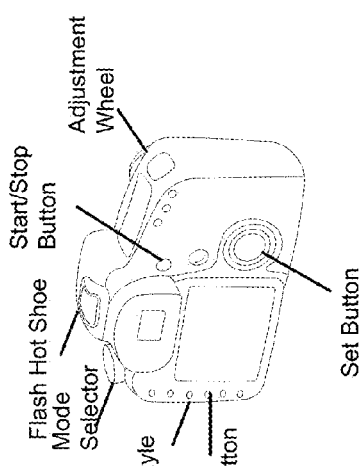
FIG. 3h
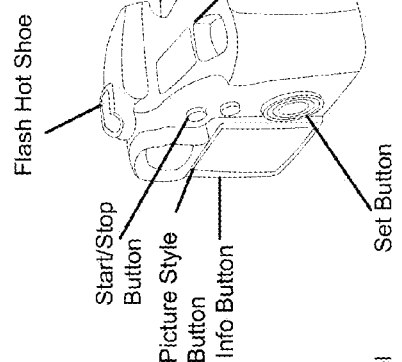
FIG. 3g
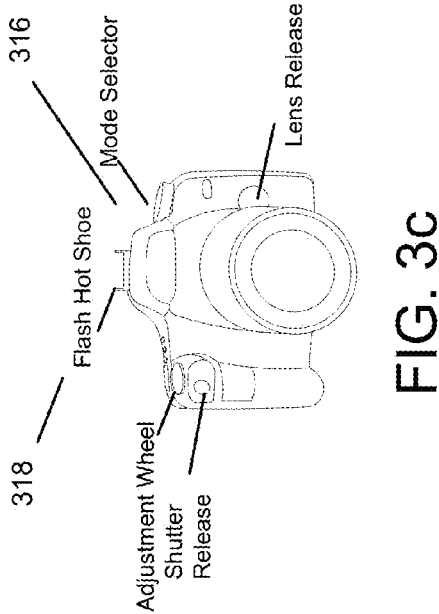
FIG. 3f
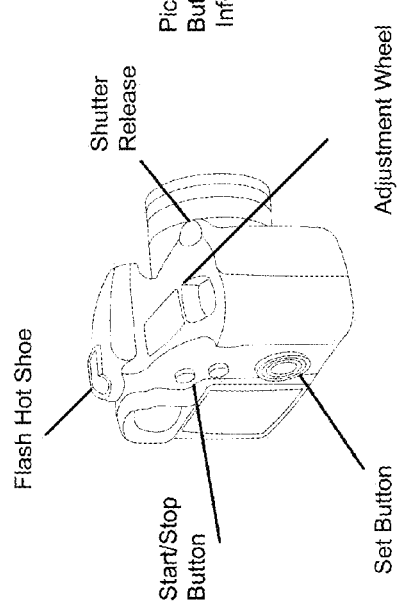

414

```
       ┌─9A─┐
       └─┬──┘                              900b
         ▼                                                          912
┌─────────────────────────────────────────────────────────────┐
│ Initiate display of annotation information associated with the 3-D image object │
└─────────────────────────┬───────────────────────────────────┘
                          ▼                                         914
┌─────────────────────────────────────────────────────────────┐
│ The annotation information includes one or more of advertising information, │
│ descriptive information associated with the 3-D image object, or social media │
│ information associated with the obtained document            │
└─────────────────────────┬───────────────────────────────────┘
                          ▼                                         916
┌─────────────────────────────────────────────────────────────┐
│ The obtained document includes one or more of a web page, a video file, a │
│ text document that includes one or more embedded images, an email │
│ message that includes one or more embedded images, or a document that │
│ includes one or more attached images                         │
└─────────────────────────┬───────────────────────────────────┘
                          ▼                                         918
┌─────────────────────────────────────────────────────────────┐
│ If the obtained document includes the video file, the selection of at least a │
│ portion of the 2-D image includes a selection of at least a portion of a frame │
│ image of the video file                                      │
└─────────────────────────────────────────────────────────────┘

┌─9B─┐
       └─┬──┘
         ▼
┌─────────────────────────────────────────────────────────────┐
│ Initiate an animated display of the 2-D image, based on one or more of a │   920
│ determination that at least a portion of the 2-D image matches the 3-D image │
│ object stored in the object database, attributes associated with the query, │
│ attributes obtained from a user profile, attributes associated with recent query │
│ history, attributes obtained from social networking information, or attributes │
│ obtained from one or more sponsors of sponsored content      │
└─────────────────────────────────────────────────────────────┘

┌─9C─┐
       └─┬──┘
         ▼
┌─────────────────────────────────────────────────────────────┐
│ Initiate the 3-D rendering of the 3-D image object that corresponds to the │
│ selected portion of the 2-D image via a browser plug-in included in a user │
│ browser, based on one or more of initiating a rendering of a 3-D pop-up │   922
│ image associated with the selected portion of the 2-D image, initiating a 3-D │
│ rendering of a plurality of different 3-D rotated image views associated with │
│ the 3-D image object that corresponds to the selected portion of the 2-D │
│ image, or initiating a 3-D rendering of the 3-D image object that corresponds │
│ to the selected portion of the 2-D image, based on manipulation indicators │
│ obtained from a user input device                            │
└─────────────────────────────────────────────────────────────┘
```

FIG. 9b

THREE-DIMENSIONAL OBJECT BROWSING IN DOCUMENTS

BACKGROUND

Users of electronic devices frequently search for items that may include text and images. For example, if a user is searching for an item to buy, it may be desirable to view a picture of the item first. Further, merchants may wish to post quality images of their products, in hopes that users will be visually enticed to instantly purchase their products. As another example, a user may wish to view images of places they would like to visit, to obtain a "feel" of various environments, before booking airline tickets for a trip.

SUMMARY

According to one general aspect, a system may include one or more processors, and at least one tangible computer-readable storage medium storing instructions executable by the one or more processors. The executable instructions may be configured to cause at least one data processing apparatus to obtain query results, and obtain a document that includes a first image object representing an image, based on the obtained query results. Further, the at least one data processing apparatus may obtain a selection indicator representing a selection of at least a portion of the image. Further, the at least one data processing apparatus may determine a match correspondence between the selected portion of the image and a database three-dimensional (3-D) image object, based on web crawler image matching analysis results previously stored in an image association database index. Further, the at least one data processing apparatus may initiate a 3-D rendering of the database 3-D image object that corresponds to the selected portion of the image.

According to another aspect, a plurality of database three-dimensional (3-D) image objects may be obtained. Each of the database 3-D image objects may represent a 3-D model associated with corresponding two-dimensional (2-D) images. Storage of the plurality of database 3-D image objects in a 3-D model database may be initiated. A document may be obtained based on a web crawl operation, the document including an image object representing a first 2-D image. A match correspondence may be determined between the obtained image object and a matching one of the database 3-D image objects. The matching database 3-D image object may represent a matched 3-D model associated with the first 2-D image. An entry of a match indicator may be initiated, in an image association database index. The match indicator may indicate the match correspondence between the obtained image object included in the document and the matching database 3-D image object stored in the 3-D model database.

According to another aspect, a computer program product tangibly embodied on a computer-readable storage medium may include executable code that may cause at least one data processing apparatus to obtain a document that includes a representation of a two-dimensional (2-D) image. Further, the at least one data processing apparatus may obtain a selection indicator indicating a selection of at least a portion of the 2-D image. Further, the at least one data processing apparatus may obtain, via a device processor, a match correspondence between the selected portion of the 2-D image and a three-dimensional (3-D) image object stored in an object database, the match correspondence based on a web crawler analysis result. Further, the at least one data processing apparatus may initiate a 3-D rendering of the 3-D image object that corresponds to the selected portion of the 2-D image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

DETAILED DESCRIPTION

Figure 1:
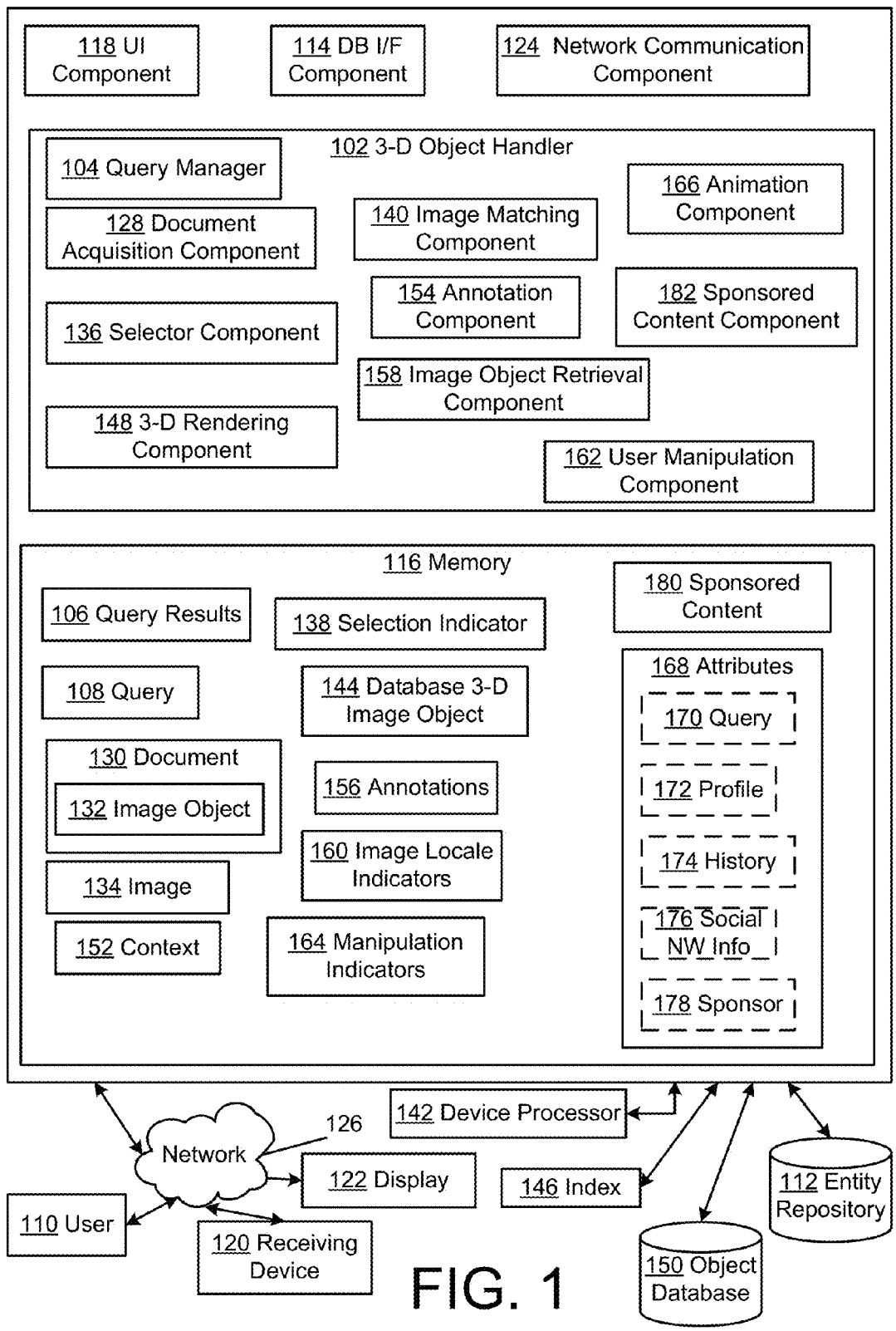
FIG. 1 is a block diagram of an example system for three-dimensional object browsing in documents.

Users of search engines frequently desire images of searched items, to provide a more enjoyable visual (or otherwise sensory) browsing experience. Example techniques discussed herein may provide an ability to select (e.g., via a click, touch, voice command, or other gesture) an object in an image on the web, and receive a three-dimensional (3-D) representation of the object, e.g., to pop up in the web browser, providing a visual user experience as if the user had pulled the object itself out of the picture. For example, the user may then manipulate the 3-D representation (e.g., turn the 3-D image) to view it from different angles. For example, the user may view annotations such as where to buy an item represented by the image, and what other people have said about the item. Example techniques discussed herein may thus be used, at least, for searching, browsing and advertising experiences.

According to an example embodiment, as an object is manipulated, a link to community annotations may become visible, so that the user may view what other people have said about the item. For example, if a user clicks on a picture of a PRIUS, then the user may be provided with opportunities to click to a set of reviews, testimonials, descriptions of how it works, etc. For example, the object may generally provide an entry-point into a WIKIPEDIA-like collection of information, accessed by clicking on any occurrence of the object in any picture. According to example embodiments discussed herein, sponsored links and audio may be shown and played, simultaneous with object activation and/or manipulation.

According to an example embodiment, a server or cloud provider (or group of providers) may maintain at least one database of 3-D object models, and then initiate scanning for them in images as part of a web crawl in a search engine (e.g., BING, GOOGLE, YAHOO!). According to an example embodiment, when an object is detected in an image, a subsequent user-click (or other selection action) may instantiate the 3-D model in the database for manipulation.

As discussed further herein, one or more databases of 3-D image objects may be maintained. For example, images associated with the 3-D image objects may be scanned as part of an offline web crawl. For example, the set of objects scanned for may be determined based on items in the text of associated web pages.

As another example, images may be scanned on-demand for items that users have recently searched for. For example, if a user searches for SWINGLINE staplers, the images subsequently viewed may be scanned for the presence of a SWINGLINE stapler.

As discussed further herein, a database of associations may be maintained which indicate the objects that are present in specific images, and where. As discussed further herein, web browsers may be modified to provide instantiation of an associated 3-D object, and a display of the 3-D object, when a browser user selects (e.g., via a click or other selection action) a portion of a currently displayed image in a document.

According to an example embodiment, community annotations may be associated with 3-D objects in the database. Further, the community annotations may be displayed in association with the respective associated 3-D objects.

According to an example embodiment, sponsored content (e.g., sponsored advertising) may be provided (e.g., displayed, played) when a user manipulates an instantiated object.

According to an example embodiment, images associated with 3-D objects in the database may be displayed as "active objects" when a document (e.g., a web page) is browsed. These objects are termed "active" because they may spontaneously display some attribute that signals to the viewer that they can be animated into 3-D. For example, the associated images may be displayed as spontaneously wobbling or moving (or otherwise highlighted or animated) when the document (e.g., a web page) is browsed.

According to an example embodiment, such active objects may be used as a form of advertising. For example, a company such as TOYOTA may pay to have occurrences of red PRIUSes spontaneously wobble on a web page whenever an image that includes a PRIUS is viewed. For example, such activity may entice users into clicking on them (or otherwise selecting the images) to inquire further about the product.

According to an example embodiment, context-based filtering may be used to determine which objects may be activated, or animated, when a user browses a document. For example, a user context (e.g., recent search query, known hobbies of the user) may be used to determine when to allow objects to be animated. For example, if a user searches for "PRIUS," and then browses a page that in the absence of other information might match either a TOYOYA PRIUS or a HONDA ACCORD, it may be determined that a PRIUS model will be activated when the user clicks on the ambiguous region. Or, if the user browses a page that includes images of both a TOYOYA PRIUS and a HONDA ACCORD, it may be determined that only TOYOTA PRIUS images will be activated, and may be rendered in 3-D when selected.

As further discussed herein, FIG. 1 is a block diagram of a system 100 for three-dimensional object browsing in documents. As shown in FIG. 1, a system 100 may include a three-dimensional (3-D) object handler 102 that includes a query manager 104 that may be configured to obtain query results 106. For example, the query results 106 may be obtained in response to a query 108. For example, a user 110 may enter the query 108 via a user input device.

According to an example embodiment, the 3-D object handler 102, or one or more portions thereof, may include executable instructions that may be stored on a tangible computer-readable storage medium, as discussed below. According to an example embodiment, the computer-readable storage medium may include any number of storage devices, and any number of storage media types, including distributed devices.

According to an example embodiment, the 3-D object handler 102 may be implemented in association with one or more user devices. For example, the 3-D object handler 102 may be implemented as a browser plug-in or add-on, on a user device. For example, the 3-D object handler 102 may communicate with a server, as discussed further below.

For example, an entity repository 112 may include one or more databases, and may be accessed via a database interface component 114. One skilled in the art of data processing will appreciate that there are many techniques for storing repository information discussed herein, such as various types of database configurations (e.g., relational databases, hierarchical databases, distributed databases) and non-database configurations.

According to an example embodiment, the 3-D object handler 102 may include a memory 116 that may store the query results 106. In this context, a "memory" may include a single memory device or multiple memory devices configured to store data and/or instructions. Further, the memory 116 may span multiple distributed storage devices.

According to an example embodiment, a user interface component 118 may manage communications between the user 110 and the 3-D object handler 102. The user 110 may be associated with a receiving device 120 that may be associated with a display 122 and other input/output devices. For example, the display 122 may be configured to communicate with the receiving device 120, via internal device bus communications, or via at least one network connection.

According to example embodiments, the display 122 may be implemented as a flat screen display, a print form of display, a two-dimensional display, a three-dimensional display, a static display, a moving display, sensory displays such as tactile output, audio output, and any other form of output for communicating with a user (e.g., the user 110).

According to an example embodiment, the 3-D object handler 102 may include a network communication component 124 that may manage network communication between the 3-D object handler 102 and other entities that may communicate with the 3-D object handler 102 via at least one network 126. For example, the network 126 may include at least one of the Internet, at least one wireless network, or at least one wired network. For example, the network 126 may include a cellular network, a radio network, or any type of network that may support transmission of data for the 3-D object handler 102. For example, the network communication component 124 may manage network communications between the 3-D object handler 102 and the receiving device 120. For example, the network communication component 124 may manage network communication between the user interface component 118 and the receiving device 120.

According to an example embodiment, the 3-D object handler 102, or one or more portions thereof, may be implemented via a browser plug-in associated with a user device.

A document acquisition component 128 may be configured to obtain a document 130 that includes a first image object 132 representing an image 134, the based on the obtained query results 106. For example, the image 134 may include a two-dimensional (2-D) image.

A selector component 136 may be configured to obtain a selection indicator 138 representing a selection of at least a portion of the image 134.

An image matching component 140 may be configured to determine, via a device processor 142, a match correspondence between the selected portion of the image 134 and a database three-dimensional (3-D) image object 144, based on web crawler image matching analysis results previously stored in an image association database index 146.

In this context, a "processor" may include a single processor or multiple processors configured to process instructions associated with a processing system. A processor may thus include one or more processors processing instructions in parallel and/or in a distributed manner. Although the device processor 142 is depicted as external to the 3-D object handler 102 in FIG. 1, one skilled in the art of data processing will appreciate that the device processor 142 may be implemented as a single component, and/or as distributed units which may be located internally or externally to the 3-D object handler 102, and/or any of its elements.

For example, the system 100 may include one or more processors 142. For example, the system 100 may include at least one tangible computer-readable storage medium storing instructions executable by the one or more processors, the executable instructions configured to cause at least one data processing apparatus to perform operations associated with various example components included in the system 100, as discussed herein. For example, the one or more processors 142 may be included in the at least one data processing apparatus. One skilled in the art of data processing will understand that there are many configurations of processors and data processing apparatuses that may be configured in accordance with the discussion herein, without departing from the spirit of such discussion.

In this context, a "component" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components).

A 3-D rendering component 148 may be configured to initiate a 3-D rendering of the database 3-D image object 144 that corresponds to the selected portion of the image 134.

For example, an object database 150 of database 3-D image objects 144 may be maintained. For example, the 3-D image objects 144 may include 3-D models. For example, the database 150 of 3-D image objects 144 may be maintained in association with a search engine or a web crawler. For example, 3-D models may be input to the database 150 via spin photography, laser scanning, 3-D camera devices such as KINECT input devices, LIFECAM cameras, computer-aided design (CAD) models generated by respective users, etc. For example, manufacturers and/or retailers may wish to upload 3-D models associated with their current product offerings.

For example, a web crawler may detect objects associated with the 3-D models in images. For example, the web crawler may detect the associated objects based on image captions included in web documents.

According to an example embodiment, the 3-D rendering component 148 may be configured to initiate the 3-D rendering based on initiating a rendering of a 3-D pop-up image associated with the selected portion of the image 134.

For example, the image matching component 140 may be configured to determine the match correspondence based on the web crawler image matching analysis results and a context 152 based on one or more of the query 108, text located within a predetermined proximity to the obtained first image object 132 in the obtained document 130, a title associated with the obtained document 130, information obtained via a source that references the obtained document 130, or a storage address indicator associated with the obtained first image object 132.

An annotation component 154 may be configured to obtain one or more annotations 156 associated with the database 3-D image object 144. For example, the annotations 156 may include community annotations such as various user experiences, comments, and/or testimonials associated with the database 3-D image object 144. For example, such annotations 156 may be obtained from the respective users directly, or may be obtained from other sources such as social network applications or "wiki"-type sources. For example, the annotations 156 may include descriptive items that describe various portions of 3-D images associated with the database 3-D image object 144.

For example, the annotations 156 may include names of various parts of items such as cameras, animals, structures, electronic gadgets, etc., that may be depicted as a 3-D image via the database 3-D image object 144. For example, the annotations 156 may include names of structures or buildings that may be depicted, in a group, as a 3-D image, via the database 3-D image object 144. For example, the annotations 156 may be displayed with a 3-D rendering when a user clicks on an object such as a 2-D image corresponding to the database 3-D image object 144.

For example, the annotations 156 may include text, audio, and/or any other sensory data such as varying pressure, varying temperature, color modifications of displayed objects, rumbling walls, smoke, steam, odors, etc.

According to an example embodiment, an image object retrieval component 158 may be configured to initiate retrieval, from the object database 150, of the database 3-D image object 144 that corresponds to the selected portion of the image 134.

According to an example embodiment, the 3-D rendering component 148 may be configured to initiate the 3-D rendering of the retrieved database 3-D image object 144 that corresponds to the selected portion of the image 134, with the obtained annotations 156.

According to an example embodiment, the annotation component 154 may be configured to obtain the one or more annotations 156 associated with the database 3-D image object 144 from one or more of a user, a marketing application, a social networking application, or an annotations database.

According to an example embodiment, at least a portion of the annotations 156 may include one or more image locale indicators 160 indicating localities within the database 3-D image object 144 that are associated with each of the of annotations 156 included in the portion of the annotations 156.

According to an example embodiment, the 3-D rendering component 148 may be configured to initiate the 3-D rendering of the retrieved database 3-D image object 144 that corresponds to the selected portion of the image 134, with the portion of the annotations 156 displayed in association with the indicated localities within the retrieved database 3-D image object 144.

According to an example embodiment, a user manipulation component 162 may be configured to obtain manipulation indicators 164 from a user input device. The 3-D rendering component 148 may be configured to initiate the 3-D rendering of the database 3-D image object 144 that corresponds to the selected portion of the image 134, based on the received manipulation indicators 164.

For example, the 3-D rendering component 148 may be configured to initiate the 3-D rendering of the database 3-D image object 144, based on a 3-D rendering of a plurality of different 3-D rotated image views associated with the database 3-D image object 144. For example, the manipulation indicators 164 may include coordinates associated with a directional user movement on an input device. For example, if the user 110 moves a mouse to the right, the manipulation indicators 164 may include the varying coordinates associated with the right-moving mouse, and may be used by the 3-D rendering component 148 to initiate the 3-D rendering of the database 3-D image object 144 to indicate a right rotation of an associated 3-D image.

For example, the manipulation indicators 164 may indicate a user morphing action directed to the associated 3-D image. For example, the user 110 may view a 3-D image associated with a "stock" wedding ring, and may choose to customize the ring, based on morphing various portions of the ring, as desired. For example, the user 110 may then initiate a printing of the customized ring to a 3-D printing device. For example, the 3-D printed version may then be used as a mold for an actual customized wedding ring. One skilled in the art of data processing will understand that there are many other applications for such morphing activities, without departing from the spirit of the discussion herein.

According to an example embodiment, the 3-D rendering may be accomplished via 3-D printing of database 3-D image objects 144. For example, 3-D printers may be available from companies such as 3D-SYSTEMS and DESKTOP FACTORY.

As another example, the user 110 may morph a 3-D image into a different 3-D image, and may then initiate storage of the different 3-D image into the object database 150.

An example animation component 166 may be configured to initiate a rendering of an indication of one or more active images. For example, the rendering may include a rendering of a wobble activity associated with the one or more active images, or a rendering of one or more active image visual indicators associated with the one or more active images. For example, a selection of the one or more active images for the rendering of the indication is based on one or more of attributes 168 associated with the query (170), attributes obtained from a user profile 172, attributes associated with recent query history 174, attributes obtained from social networking information 176, attributes obtained from one or more sponsors 178 of sponsored content 180, or match information obtained from the image association database index.

For example, the user 110 may initiate a web search for a search item, such as a "toy bird." For example, a web browser associated with the web search may initiate activation (e.g., via animation) of occurrences of the searched item in all retrieved web pages. For example, the animation may attract the user's attention to select (e.g., click) and manipulate a 3-D rendering associated with the 2-D image.

According to an example embodiment, a sponsored content component 182 may be configured to initiate output of sponsored content 180 that corresponds to the selected portion of the image 134, based on one or more of initiating output of the sponsored content 180 with the 3-D rendering of the indication of one or more active images, or initiating output of the sponsored content 180 with the 3-D rendering of the database 3-D image object 144.

For example, when a user selects, or clicks on an object, the user may experience (e.g., view, hear, feel) sponsored links, and/or hear sponsored audio, or experience other sensory activities that may be associated with the selected object. For example, the sponsored content 180 may be displayed as links to web pages associated with sponsors, or as advertisements of sales and discounts available to viewers of the sponsored content 180. According to an example embodiment, the sponsored content 180 may include sponsored audio tracks, such as a commercial jingle or a product testimonial, in accompaniment with the 3-D rendering of the database 3-D image object 144 and/or the 3-D rendering of the indication of one or more active images.

Figure 2:
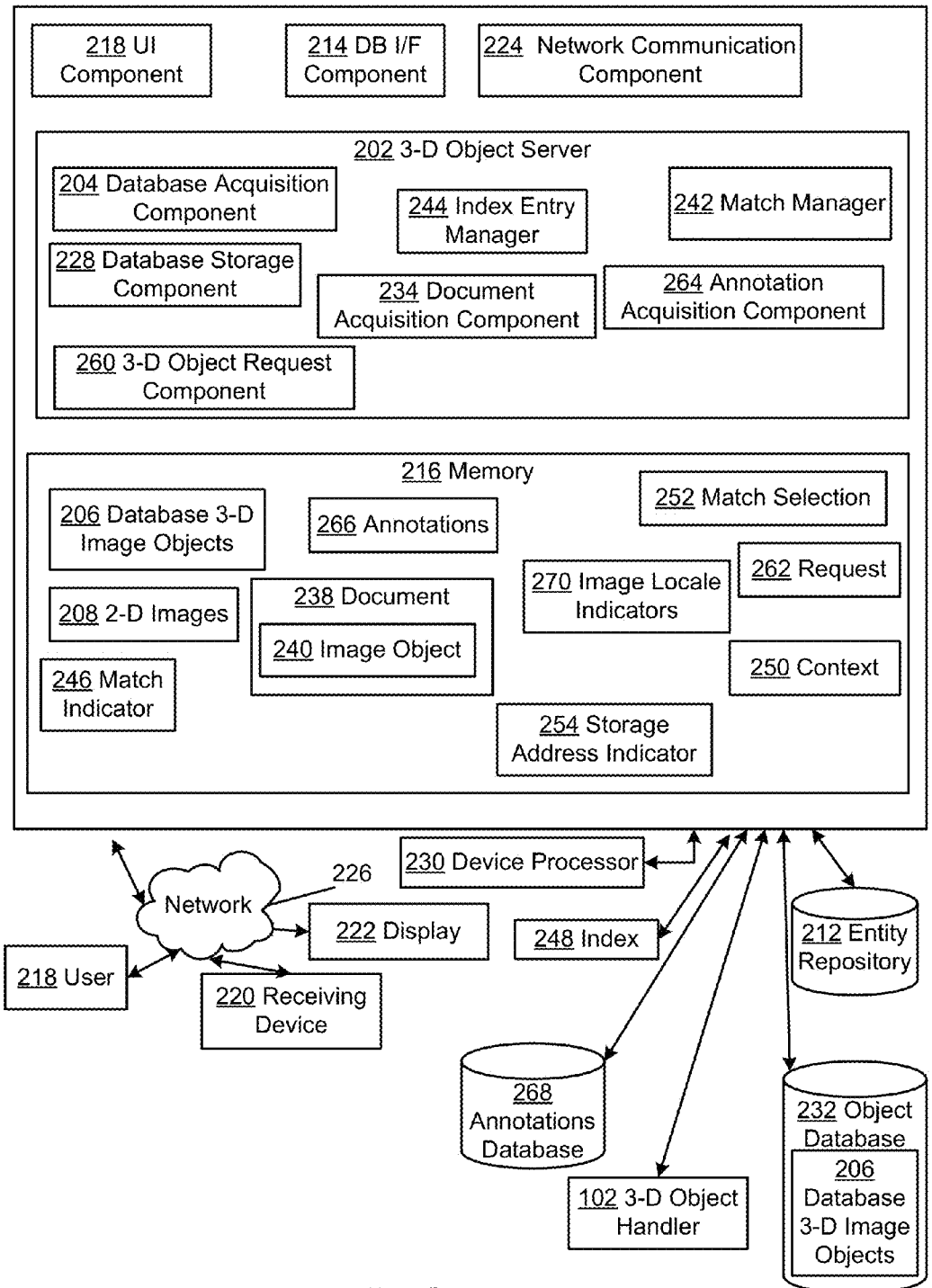
FIG. 2 is a block diagram of an example system for three-dimensional object browsing in documents.

According to another aspect as shown in FIG. 2, a 3-D object server 202 may include a database acquisition component 204 that may be configured to obtain a plurality of database 3-D image objects 206. Each of the database 3-D image objects 206 may represent a three-dimensional (3-D) model associated with corresponding two-dimensional (2-D) images 208. For example, the 3-D object server 202 may be in communication with the 3-D object handler 102. For example, the 3-D object server 202 may be in communication with the 3-D object handler 102 directly, or via one or more networks.

According to an example embodiment, the 3-D object server 202, or one or more portions thereof, may include executable instructions that may be stored on a computer-readable storage medium, as discussed below. According to an example embodiment, the computer-readable storage medium may include any number of storage devices, and any number of storage media types, including distributed devices.

For example, an entity repository 212 may include one or more databases, and may be accessed via a database interface component 214. One skilled in the art of data processing will appreciate that there are many techniques for storing repository information discussed herein, such as various types of database configurations (e.g., relational databases, hierarchical databases, distributed databases) and non-database configurations.

According to an example embodiment, the 3-D object server 202 may include a memory 216 that may store the database 3-D image objects 206. As discussed above, a "memory" may include a single memory device or multiple memory devices configured to store data and/or instructions. Further, the memory 216 may span multiple distributed storage devices.

According to an example embodiment, a user interface component 218 may manage communications between a user 220 and the 3-D object server 202. The user 218 may be associated with a receiving device 220 that may be associated with a display 222 and other input/output devices. For example, the display 222 may be configured to communicate with the receiving device 220, via internal device bus communications, or via at least one network connection.

According to example embodiments, the display 222 may be implemented as a flat screen display, a print form of display, a two-dimensional display, a three-dimensional display, a static display, a moving display, sensory displays such as tactile output, audio output, and any other form of output for communicating with a user (e.g., the user 218).

According to an example embodiment, the 3-D object server 202 may include a network communication component 224 that may manage network communication between the 3-D object server 202 and other entities that may communicate with the 3-D object server 202 via at least one network 226. For example, the network 226 may include at least one of the Internet, at least one wireless network, or at least one wired network. For example, the network 226 may include a cellular network, a radio network, or any type of network that may support transmission of data for the 3-D object server 202. For example, the network communication component 224 may manage network communications between the 3-D object server 202 and the receiving device 220. For example, the network communication component 224 may manage network communication between the user interface component 218 and the receiving device 220.

A database storage component 228 may initiate storage, via a device processor 230, of the plurality of database 3-D image objects 206 in an object database 232. For example, the object database 232 may include a 3-D model database.

As discussed above, a "processor" may include a single processor or multiple processors configured to process instructions associated with a processing system. A processor may thus include one or more processors processing instructions in parallel and/or in a distributed manner. Although the device processor 230 is depicted as external to the 3-D object server 202 in FIG. 2, one skilled in the art of data processing will appreciate that the device processor 230 may be implemented as a single component, and/or as distributed units which may be located internally or externally to the 3-D object server 202, and/or any of its elements.

A document acquisition component 234 may obtain a document 238 based on a web crawl operation, the document 238 including an image object 240 representing a first 2-D image 208.

A match manager 242 may determine a match correspondence between the obtained image object 240 and a matching one of the database 3-D image objects 206, the matching database 3-D image object 206 representing a matched 3-D model associated with the first 2-D image 208.

For example, a system for browsing and organizing large photo collections of popular sites which exploits a common 3-D geometry of underlying scenes is discussed in Noah Snavely, Steven M. Seitz, Richard Szeliski, "Photo tourism: Exploring photo collections in 3D," ACM *Transactions on Graphics* (SIGGRAPH Proceedings), 25(3), 2006, pp. 835-846. The approach discussed therein is based on determining, from the images themselves, the photographers' locations and orientations, along with a sparse 3D geometric representation of the underlying scene.

For example, the match manager 242 may also determine matches between database 3-D image objects 206 and images obtained from additional sources as well. For example, the match manager 242 may determine matches between database 3-D image objects 206 and frames obtained from videos, or images obtained from user input.

An index entry manager 244 may initiate an entry of a match indicator 246, indicating the match correspondence between the obtained image object 240 included in the document 238 and the matching database 3-D image object 206 stored in the object database 232, in an image association database index 248.

According to an example embodiment, during indexing, potential matches may be limited based on searching for an item on web pages that have been viewed shortly after a search engine's search for the item. Additionally, text associated with images may be used to further limit the set of potential matches. According to an example embodiment, at runtime, in the context of a search engine's search for a specific item, a subsequent verification step may be performed, and only the searched object may be activated or animated, if verification succeeds.

According to an example embodiment, associated text and user search histories may be used to aid in recognition (e.g., answering the question "What appears in this image?"), potentially reducing aspects of recognition to detection (e.g., answering the question "Is there a MICROSOFT XBOX console in this image?"). In particular, whenever a user issues a search engine query or visits a product page of a shopping web site, it may be determined what to search for in subsequently viewed images and videos.

According to an example embodiment, determining the match correspondence includes determining the match correspondence between a portion of the obtained image object 240 and the matching one of the database 3-D image objects 206, the matching database 3-D image object 206 representing a 3-D image model associated with a portion of the first 2-D image 208.

According to an example embodiment, initiating the entry of the match indicator 246 includes initiating the entry of the match indicator 246, indicating the match correspondence between the portion of the obtained image object 240 included in the document 238 and the matching database 3-D image object 206 stored in the object database 232, in the image association database index 248.

According to an example embodiment, determining the match correspondence includes determining the match correspondence between the obtained image object 240 and the matching one of the database 3-D image objects 206, based on one or more of a context 250 of the obtained image object 240 in the obtained document 238, a match selection 252 obtained from a user, or a storage address indicator 254 associated with the obtained image object 240.

According to an example embodiment, the context 250 may include one or more of text located within a predetermined proximity to the obtained image object 240 in the obtained document 238, a title associated with the document 238, or information obtained via a source that references the obtained document 238.

According to an example embodiment, the storage address indicator 254 includes a Uniform Resource Locator (URL). For example, the URL may include a URL of the obtained image object 240 itself, or it may include a URL of the obtained document 238.

For example, the obtained document 238 may include one or more of a web page, a video file, a text document that includes one or more embedded images, an email message that includes one or more embedded images, or a document that includes one or more attached images. For example, if the obtained document 238 includes the video file, determining the match correspondence may include determining the match correspondence between a 2-D frame included in the video file and the matching one of the database 3-D image objects 206, the matching database 3-D image object 206 representing a 3-D image model corresponding to at least one portion of the 2-D frame.

According to an example embodiment, a 3-D object request component 260 may be configured to receive a request 262 for a requested one of the database 3-D image objects 206, wherein the request 262 includes an indicator associated with a second image object 240 representing a second 2-D image 208.

The 3-D object request component 260 may obtain the requested database 3-D image object 206, based on accessing a second match indicator 246 stored in the image association database index 248, wherein the second match indicator 246 indicates a match correspondence between the second image object 240 and the requested database 3-D image object 206 stored in the object database 232.

According to an example embodiment, an annotation acquisition component 264 may be configured to obtain a plurality of annotations 266 associated with a first one of the database 3-D image objects 206.

The annotation acquisition component 264 may store the annotations 266 and an indicator indicating an association between the first one of the database 3-D image objects 206 and the plurality of annotations 266 in an annotations database 268.

According to an example embodiment, receiving the request 262 may include receiving the request 262 for the first one of the database 3-D image objects 206.

According to an example embodiment, obtaining the requested database 3-D image object 206 may include obtaining the requested database 3-D image object 206 and initiating retrieval of the associated plurality of annotations 266 from the annotations database 268.

According to an example embodiment, obtaining the plurality of annotations 266 associated with a first one of the database 3-D image objects 206 may include obtaining the plurality of annotations 266 associated with a first one of the database 3-D image objects 206 from one or more of a user, a marketing application, or a social networking application.

According to an example embodiment, obtaining the plurality of annotations 266 associated with a first one of the database 3-D image objects 206 may include obtaining image locale indicators 270 indicating localities within the first one of the database 3-D image objects 206 that are associated with each of the plurality of annotations 266.

According to example embodiments discussed herein, 2-D images of manufactured items on the Internet may be associated with 3-D objects that users may spin around, view from all angles, and interact with. For example, manufacturers and artisans may generate 3-D models of their products and upload them into the object database 232. As a search engine indexes web pages for search, embedded images may be scanned and the presence of database objects may be determined. Subsequently, when a browser user clicks on one of the objects in an image, the full 3-D model may pop out of the page for the user to interact with. As the user spins the object around, he/she may also view community annotations (e.g., reviews, experiences, and general information) as well as sponsored links and commercial information (e.g., where to buy the object, and pricing). According to example embodiments discussed herein, user context may be used to determine which objects to activate within an image, and what information to display when the object is manipulated.

For example, the user context may be used to filter annotations 156 that may be displayed to a user with a 3-D rendering. According to an example embodiment, the annotations 156 for display to a particular user may be limited to annotations 156 received from social network "friends" of the user, or to annotations 156 that may be relevant to known interests of the particular user.

Figure 3A:
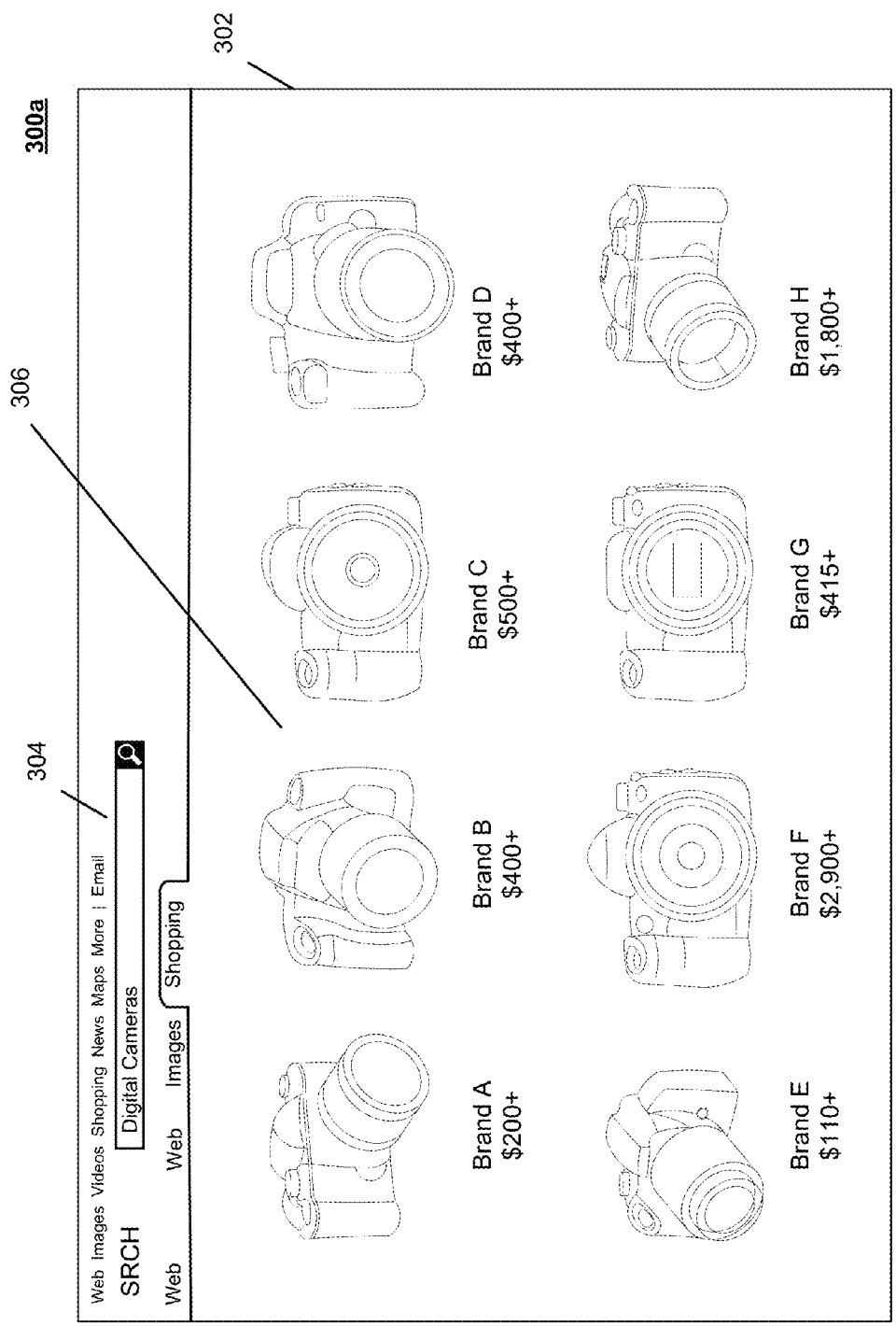
FIG. 3 depicts example user views of example three-dimensional object browsing in a document.

FIG. 3 depicts example user views of example three-dimensional object browsing in a document. As shown in FIG. 3a, a browser window 302 includes a search text box 304. As shown in FIG. 3a, a user has entered a search query for "Digital Cameras" in the search text box 304. As shown in FIG. 3a, eight results of the search appear in the browser window 302, indicating brands and price ranges of various retrieved items that include 2-D images of various digital cameras.

Figure 3B:
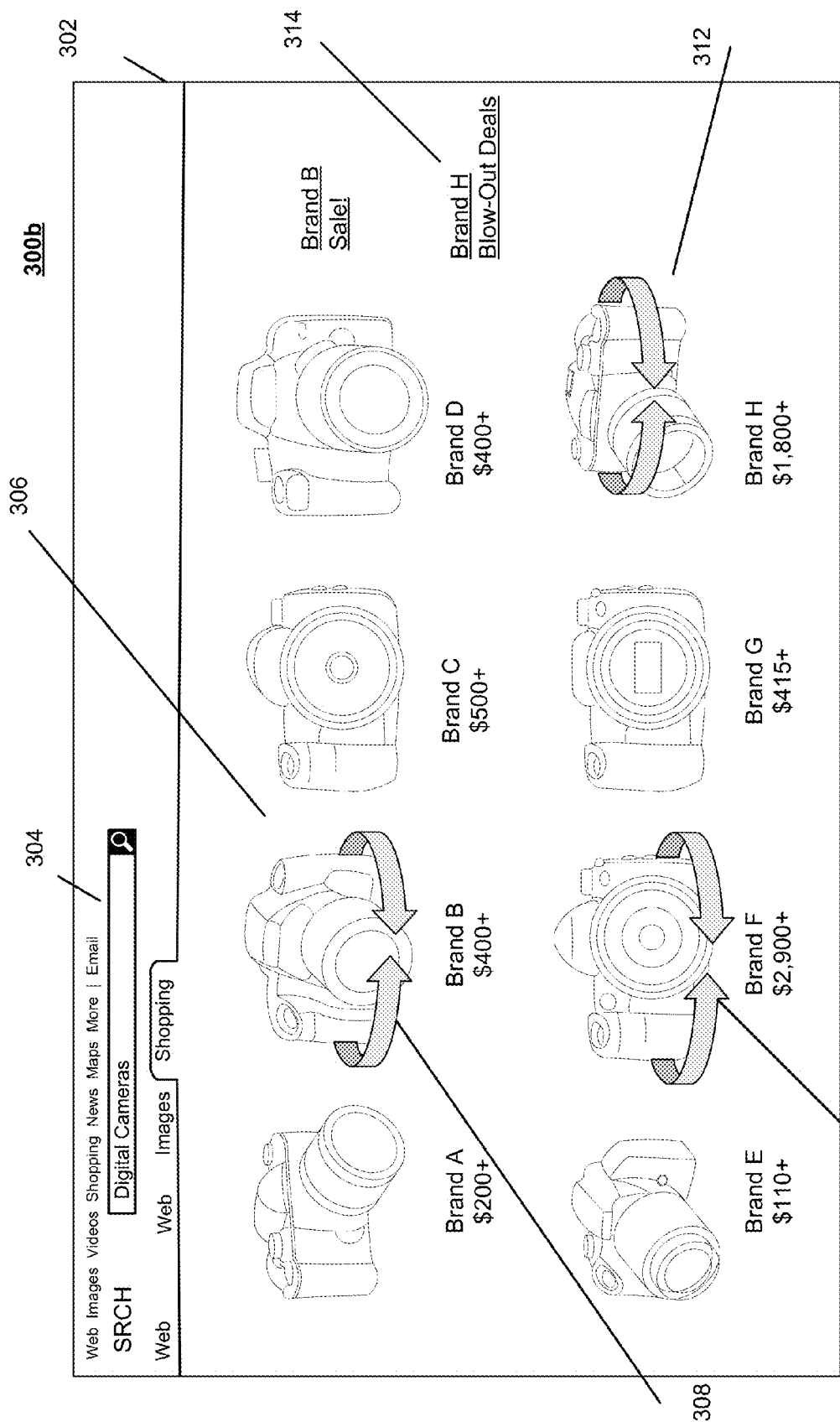

As shown in FIG. 3b, three of the retrieved images are activated, indicated by active arrows 308, 310, 312, illustrated as surrounding the respective digital cameras. According to example embodiments discussed herein, the images associated with the active arrows 308, 310, 312 may be displayed with animation features (e.g., a "wobble" or rotational motion), to further inform the user that the images associated with the active arrows 308, 310, 312 may be selected for 3-D activation.

Further as shown in FIG. 3b, sponsored content 314 may be displayed that is associated with the images associated with the active arrows 308, 310, and/or 312. For example, links may be displayed to web pages that may provide further information regarding items associated with the images that are associated with the active arrows 308, 310, 312.

As shown in FIG. 3c, a user has selected the image associated with the active arrow 312 (e.g., "Brand H"), and a 3-D pop-up image 316 of the associated digital camera is displayed. As shown in FIG. 3c, annotations 318 are also displayed, indicating various features of the associated digital camera, indicating locations on the camera of the respective features (e.g., flash hot shoe, mode selector, lens release, adjustment wheel, shutter release). For example, a browser may access the index 248 to determine which database 3-D image object 206 matches the image associated with the active arrow 312 to provide a 3-D rendering of the determined database 3-D image object 206. For example, the browser may further retrieve associated annotations 266 from the annotations database 268 for display (using associated image locale indicators 270) of the annotations 316 with the 3-D pop-up image 316.

The user may manipulate the displayed 3-D pop-up image 316 to obtain rotated views FIGS. 3d, 3e, 3f, 3g, and 3h, or the browser may provide the rotated views spontaneously. As shown in FIGS. 3d, 3e, 3f, 3g, and 3h, the annotations 316 may be varied by the browser to align with portions of the digital camera that may appear and disappear in the rotated views.

FIG. 4 depicts example user views of example three-dimensional object browsing in a document. As shown in FIG. 4a, a browser window 402 includes a search text box 404. As shown in FIG. 4a, a user has entered a search query for "New York City" in the search text box 404. As shown in FIG. 4a, a result indicating "New York City Sights" is displayed, with an image 406 of the Empire State Building and surrounding structures. As shown in FIG. 4a, a caption 408 indicates that the image illustrates the Empire State Building, and a link 410 indicates further information availability with regard to the Empire State Building, by selecting the link 410.

Figure 4A:
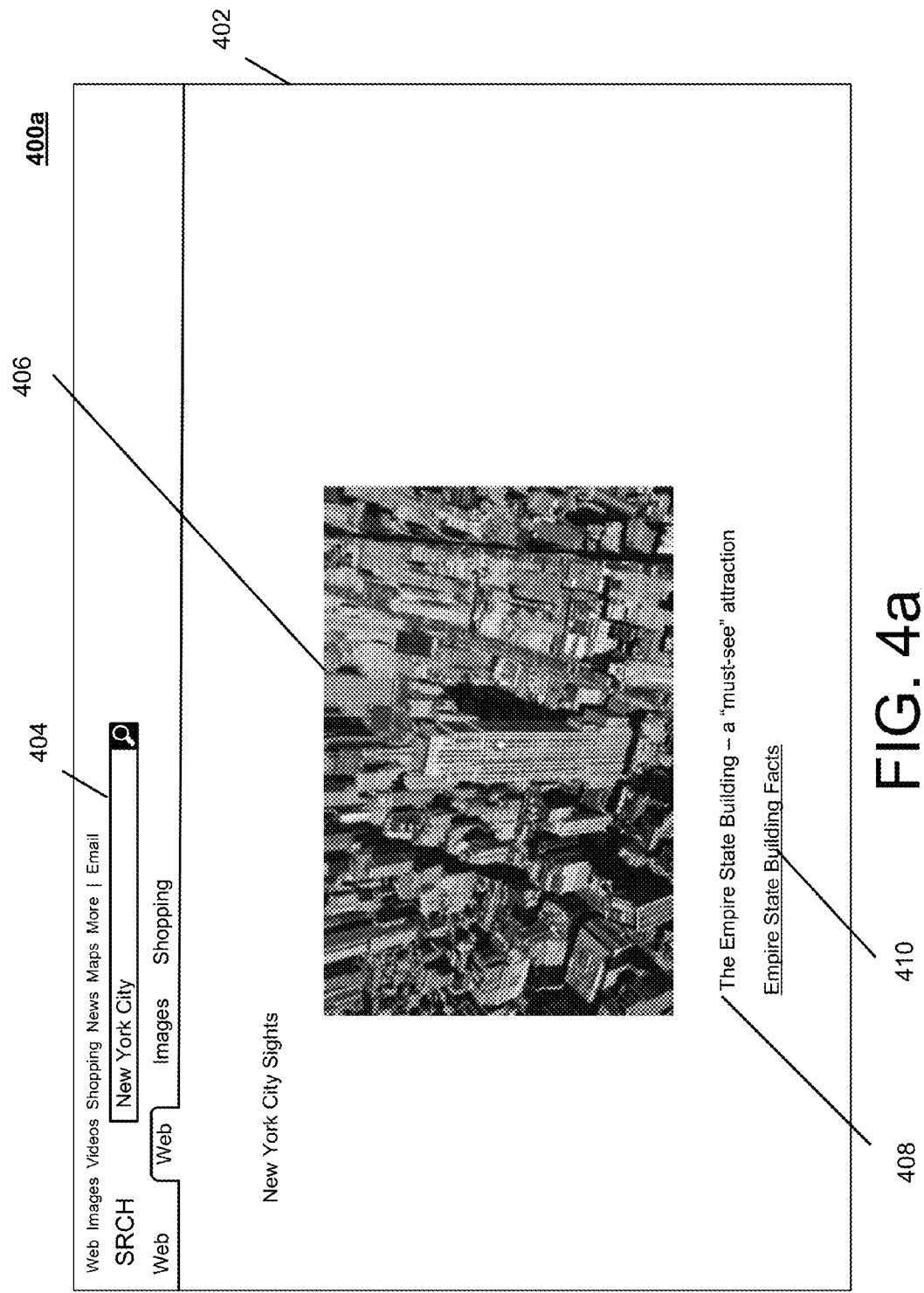
FIG. 4 depicts example user views of example three-dimensional object browsing in a document.
Figure 4B:
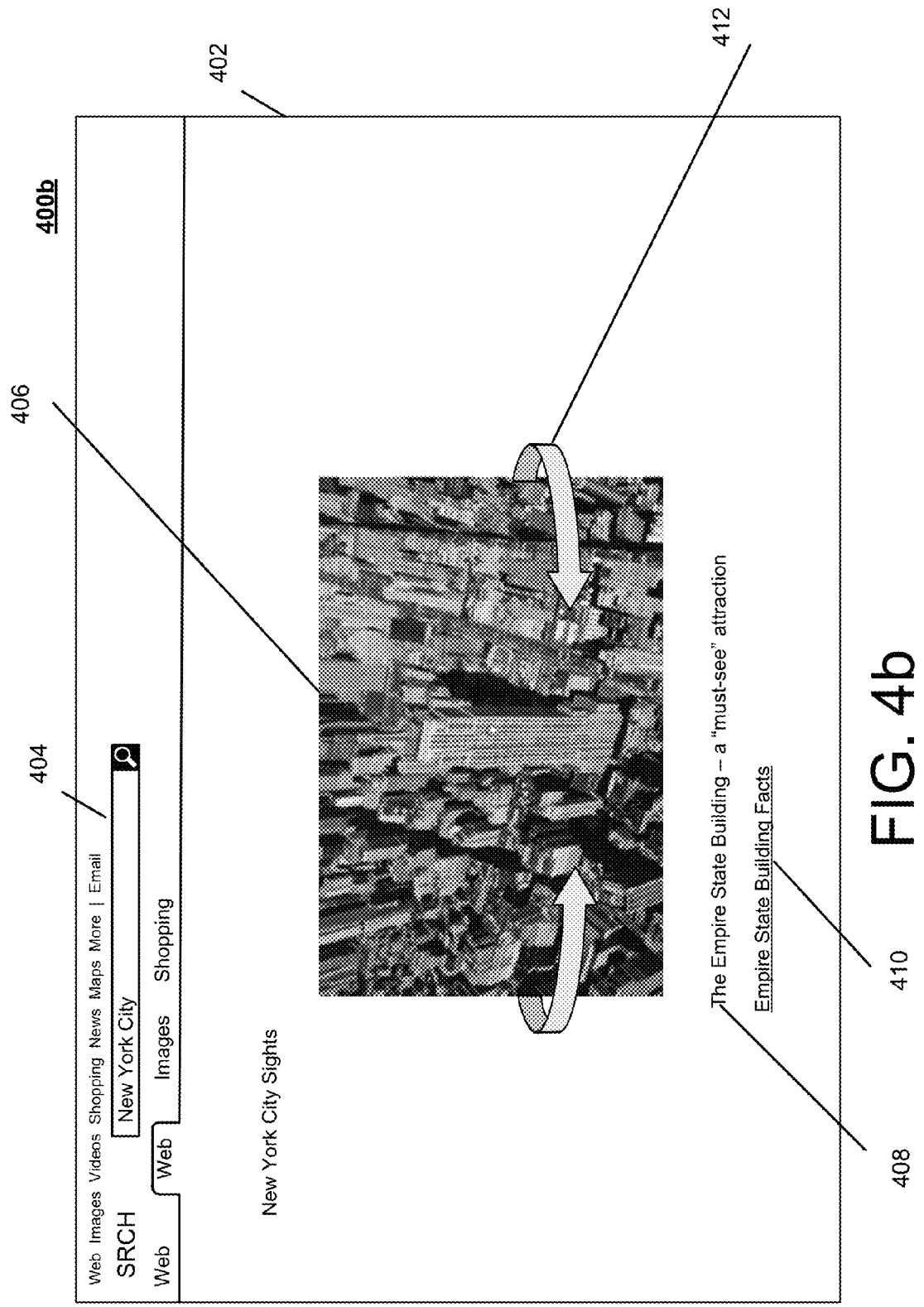
Figure 4F:
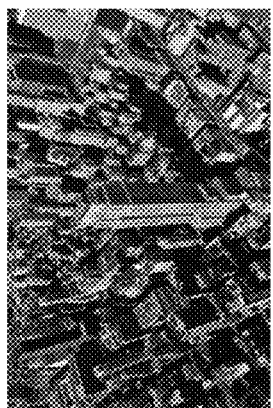
Figure 4E:
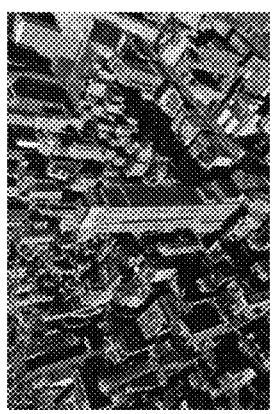
Figure 4D:
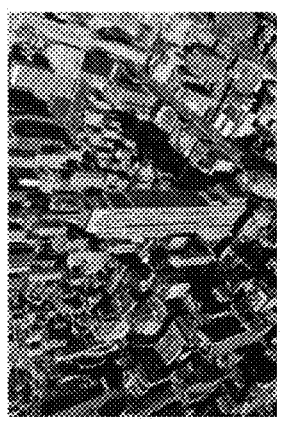

As shown in FIG. 4b, the retrieved image 406 is activated, indicated by active arrows 412, illustrated as surrounding the image 406. According to example embodiments discussed herein, the image associated with the active arrows 412 may be displayed with animation features (e.g., a "wobble" or rotational motion), to further inform the user that the images associated with the active arrows 412 may be selected for 3-D activation.

Figure 4C:
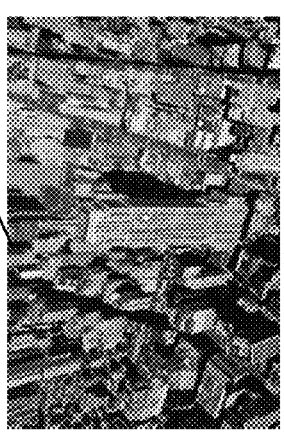
Figure 4J:
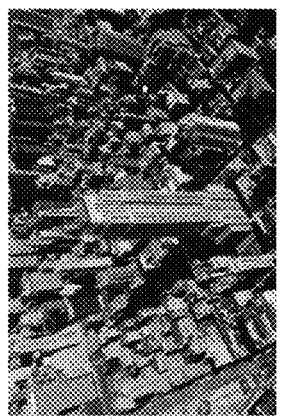
Figure 4I:
Figure 4H:
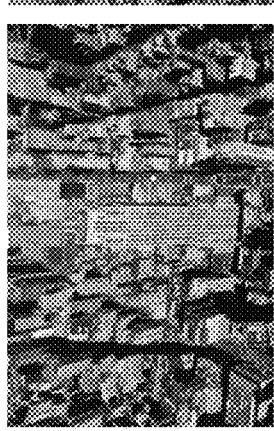
Figure 4G:
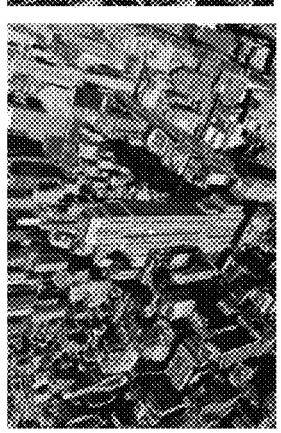

As shown in FIG. 4c, a user has selected the image associated with the active arrows, and a 3-D pop-up image 414 of the Empire State Building is displayed. The user may manipulate the displayed 3-D pop-up image 414 to obtain rotated views FIGS. 4d, 4e, 4f, 4g, 4h, 4i, and 4j, or the browser may provide the rotated views spontaneously. As shown in FIGS. 4d, 4e, 4f, 4g, 4h, 4i, and 4j, the rotated views may illustrate various structures that surround the Empire State Building in New York City, from each respective rotated view.

Although not shown in FIGS. 4c, 4d, 4e, 4f, 4g, 4h, 4i, and 4j, sponsored content may also be provided with the activated objects. For example, an audio description may accompany the various views to explain landmarks that may come in to view as the views are rotated, or historical facts associated with various portions of the associated landscape. As another example, an explanation of tourist information may be provided, to inform the user of various travel arrangements that might be made (e.g., nearby hotels, restaurants, shows).

Figure 5:
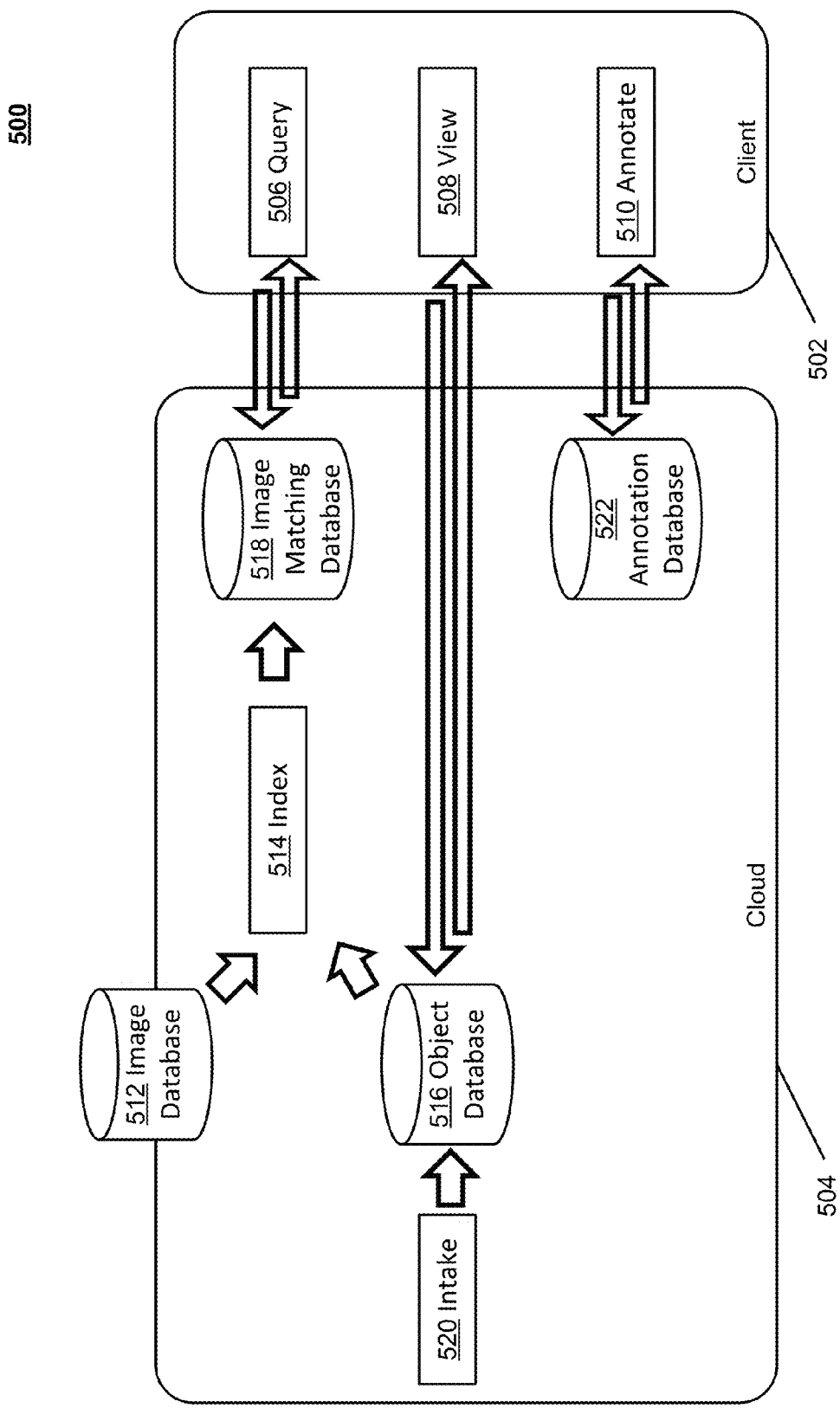
FIG. 5 is a block diagram of an example system for three-dimensional object browsing in documents.

FIG. 5 is a block diagram of an example system for three-dimensional object browsing in documents. As shown in FIG. 5, a client 502 may communicate with a cloud system 504. For example, the client 502 may include a browser plug-in located with a browser on a user device. As shown in FIG. 5, the client 502 includes a query component 506 (e.g., the query manager 104), a view component 508, and an annotate component 510 (e.g., the annotation component 154).

Further as shown in FIG. 5, the cloud system 504 includes an image database 512, an index 514 (e.g., index 146, 248), an object database 516 (e.g., the object database 150, 232), and an image matching database 518. The image matching database 518 may determine and track which objects are present in an image, and where. For example, the image matching database 518 may associate an image's URL with a set of objects and their locations and orientations within the image.

As shown in FIG. 5, the query component 506 may access the image database 512 to determine matching 3-D image objects associated with 2-D images that may be included in obtained documents (or that may be extracted from videos as frames).

Further as shown in FIG. 5, the cloud system 504 includes an intake component 520 associated with the object database 516. For example, users may manually input 3-D image objects in the object database 516, as discussed further herein. The view component 508 may access the object database to obtain the 3-D image objects for activation of 2-D images that may be included in obtained documents (e.g., via the 3-D rendering component 148).

An annotation database 522 may store annotations (e.g., the annotations 156, 266) associated with the 3-D image objects. As shown in FIG. 5, the annotation component 510 may access the annotation database 522 to store and retrieve annotations. As further discussed herein, locale information associated with the annotations, indicating locations on associated 3-D images (e.g., the image locale indicators 160), may be stored with the annotations in the annotation database 522.

Figure 6:
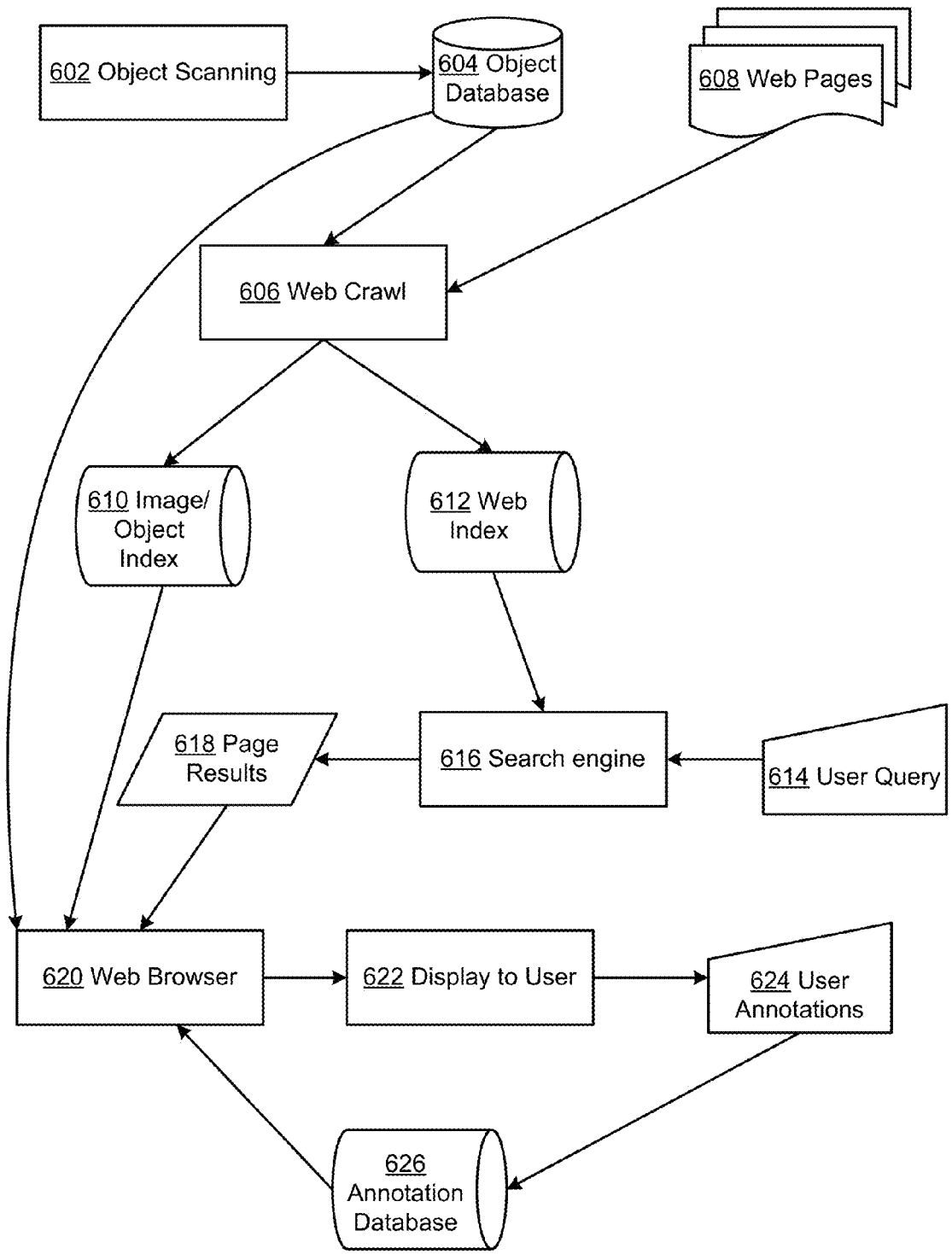
FIG. 6 is a block diagram of an example system for three-dimensional object browsing in documents.

FIG. 6 is a block diagram of an example system for three-dimensional object browsing in documents. According to an example embodiment, FIG. 6 may provide an overview of an example system for three-dimensional object browsing in documents.

As shown in FIG. 6, an object scanning component 602 may provide 3-D image objects to an object database 604 (e.g., the object database 150, 232). As discussed further herein, the 3-D image objects may be obtained from a variety of sources. For example, merchants may provide 3-D image objects to correspond to their current product offerings.

As other examples, enthusiasts, collectors, hobbyists, and artists may upload objects to appear on the web, and 3-D image objects may be scanned to correspond to those uploaded objects. For example, a car owner may utilize a three-dimensional object for a used-car ad placed by the car owner on EBAY or AUTOTRADER. For example, teenagers may share juvenile three-dimensional poses on FACEBOOK. As yet another example, three-dimensional renditions of famous landmarks and everyday places may be embedded in map services such as BING MAPS or GOOGLE MAPS.

According to an example embodiment, PHOTOSYNTH may be used in synthesis of multiple photos into 3-D representations. As an example, individual enthusiasts may have access to a collection of photos (e.g., of an enthusiast's 1966 CAMARO) from which to synthesize an object.

According to an example embodiment, for 3-D model creation, turntable photography technology is available, at least, from FOTOROBOT, SPINME, and SNAP36. For example, an AUTODESK PHOTOFLY application allows users to create 3-D models from photographs without a turntable. Additionally, ARQSPIN is associated with an IPHONE application for creating 3-D models with a cell-phone. Further, laser scanning may be used to obtain 3-D models.

A web crawl component 606 may obtain information from the object database 604 and web pages 608, to determine associations between 3-D image objects in the object database 604 and images that may be included in the web pages 608. The web crawl component 606 may then provide association information to an image/object index 610, and association and other crawl information to a web index 612.

A user query 614 may be provided to a search engine 616, which may then provide page results 618 as a result of processing the user query 614. A web browser 620 may obtain the page results 618 (e.g., as the query results 106, which include the document 130). The web browser 620 may determine matches between image objects 132 included in the page results and database 3-D image objects 144 (via the image/object index 610), and may initiate retrieval of the matching database 3-D image objects 144 from the object database 604.

According to an example embodiment, a browser plug-in, or add-on, may be implemented to interpret annotated images, access a database back-end, animate object occurrences, and display sponsored advertising and community annotations. For example, the 3-D object handler 102 of FIG. 1 may include functionality of such a browser plug-in or add-on. For example, in the context of a search engine search, the browser 620 may initiate a call to the search engine (e.g., BING, GOOGLE). Before displaying an image, the browser 620 may check the index 610 to determine whether any objects are present in the image. The browser 620 may then implement animation functionality, and access the object database 604 to retrieve relevant 3-D models. The browser 620 may then access the community annotation database 626 to display annotations. The browser 620 may then access a sponsored annotation database (not shown as a separate database in FIG. 6) to display sponsored annotations.

At least a portion of the page results 618 and the matching database 3-D image objects 144 may be displayed 622 to the user (e.g., via the 3-D rendering component 148). As shown in FIG. 6, the user may also provide user annotations 624 to an annotation database 626 (e.g., the annotations database 268). As discussed further herein, the user may provide the user annotations (e.g., the annotations 156) while the user is viewing a rendering of a 3-D image associated with one of the database 3-D image objects 144, such that image locale indicators 160 may be obtained and stored with the user annotations 624 in the annotation database 626. The annotations stored in the annotation database 626 are also available to the web browser 620 for displays associated with corresponding database 3-D image objects 144 as displays to the user 622, as discussed further herein.

According to an example embodiment, the system of FIG. 6 may analyze a symmetry of an object depicted in a 3-D image, and may transfer colorings and other visual attributes that are apparent in an initial 2-D view, to various rotational views of the 3-D image. For example, a user may submit a query to search for "AIRBUS A320." The user may obtain a 2-D image of an A320 airplane that is mostly white with a blue tail, against a background showing a runway, hills, and sky. If the user selects the image, a 3-D version of the airplane may be rendered that user can spin around. For example, a white and blue paint job from a single photo of an airplane may be transferred to the 3-D model for user interaction, based on automatically exploiting the symmetry of the object, and projecting the same paint job onto both sides.

As another example, the user may search for "FORD F-150" and view the results under "Videos." According to an example embodiment, when the user hovers over any of the videos, a small preview may begin playing. The preview may depict a red F-150 driving along a highway. If the user selects (e.g., clicks on) the pickup truck, the video may pause, and the truck may be depicted as a 3-D rendering. For example, the user may can spin the truck around and view it from any angle, and when the user puts it back, the video may continue.

According to an example embodiment, if the user stops the video again, and right clicks, a new window may appear (e.g., in a corner of the display), with other images of the F-150 flashing by. For example, the user may enter an example Object Portal. If the user clicks on the Object Portal, he/she may be directed to a collection of other F-150 images taken from across the web.

FIG. 7 is a flowchart illustrating example operations of the system of FIG. 1, according to example embodiments. In the example of FIG. 7a, query results may be obtained (702). For example, the query manager 104 may obtain the query results 106, as discussed above.

A document that includes an image object representing an image may be obtained, based on the obtained query results (704). For example, the document acquisition component 128 may obtain the document 130, as discussed above.

A selection indicator representing a selection of at least a portion of the image may be obtained (706). For example, the selector component 136 may obtain the selection indicator 138, as discussed above.

A match correspondence between the selected portion of the image and a database three-dimensional (3-D) image object may be determined, based on web crawler image matching analysis results previously stored in an image association database index (708). For example, the image matching component 140 may determine, via the device processor 142, a match correspondence between the selected portion of the image 134 and a database 3-D image object 144, as discussed above.

A 3-D rendering of the database 3-D image object that corresponds to the selected portion of the image may be initiated (710). For example, the 3-D rendering component 148 may initiate a 3-D rendering of the database 3-D image object 144, as discussed above.

For example, the query results may be obtained in response to a query (712).

According to an example embodiment, initiating the 3-D rendering may include initiating a rendering of a 3-D pop-up image associated with the selected portion of the image (714). For example, the 3-D rendering component 148 may initiate the 3-D rendering of the database 3-D image object 144 based on initiating a rendering of a 3-D pop-up image associated with the selected portion of the image 134, as discussed above.

For example, the match correspondence may be determined based on the web crawler image matching analysis results and a context based on one or more of the query, text located within a predetermined proximity to the obtained first image object in the obtained document, a title associated with the obtained document, information obtained via a source that references the obtained document, or a storage address indicator associated with the obtained first image object (716).

According to an example embodiment, manipulation indicators may be obtained from a user input device (718). For example, the user manipulation component 162 may obtain manipulation indicators 164 from a user input device, as discussed above.

According to an example embodiment, initiating the 3-D rendering may include initiating the 3-D rendering of the database 3-D image object that corresponds to the selected portion of the image, based on the received manipulation indicators (720). For example, the 3-D rendering component 148 may initiate the 3-D rendering of the database 3-D image object 144 that corresponds to the selected portion of the image 134, based on the received manipulation indicators 164, as discussed above.

For example, initiating the 3-D rendering may include initiating the 3-D rendering of the database 3-D image object that corresponds to the selected portion of the image, based on a 3-D rendering of a plurality of different 3-D rotated image views associated with the database 3-D image object (722). For example, the 3-D rendering component 148 may initiate the 3-D rendering of the database 3-D image object 144 that corresponds to the selected portion of the image 134, based on a 3-D rendering of a plurality of different 3-D rotated image views associated with the database 3-D image object 144, as discussed above.

Figure 7A:
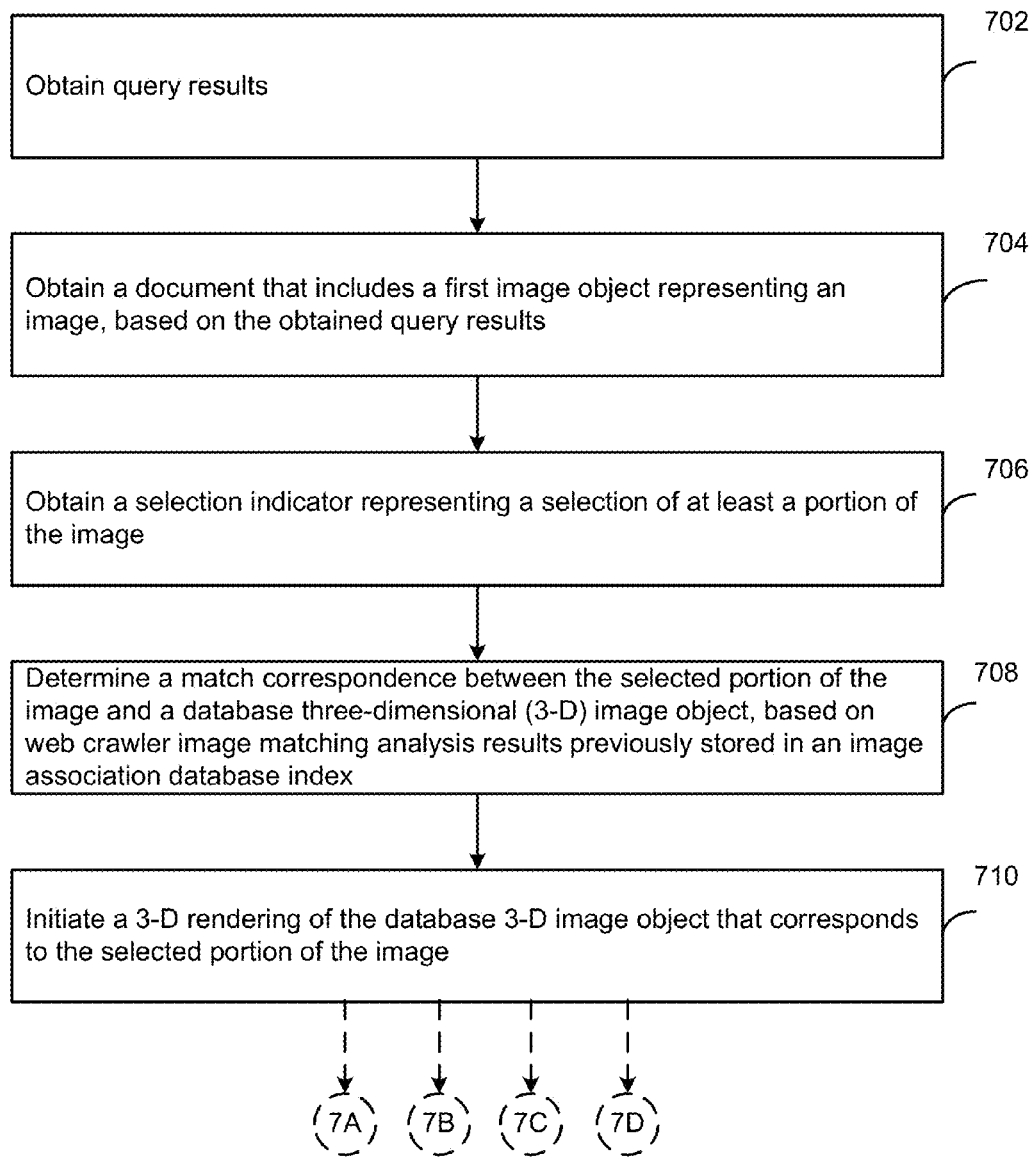
FIG. 7 is a flowchart illustrating example operations of the system of FIG. 1.
Figure 7B:
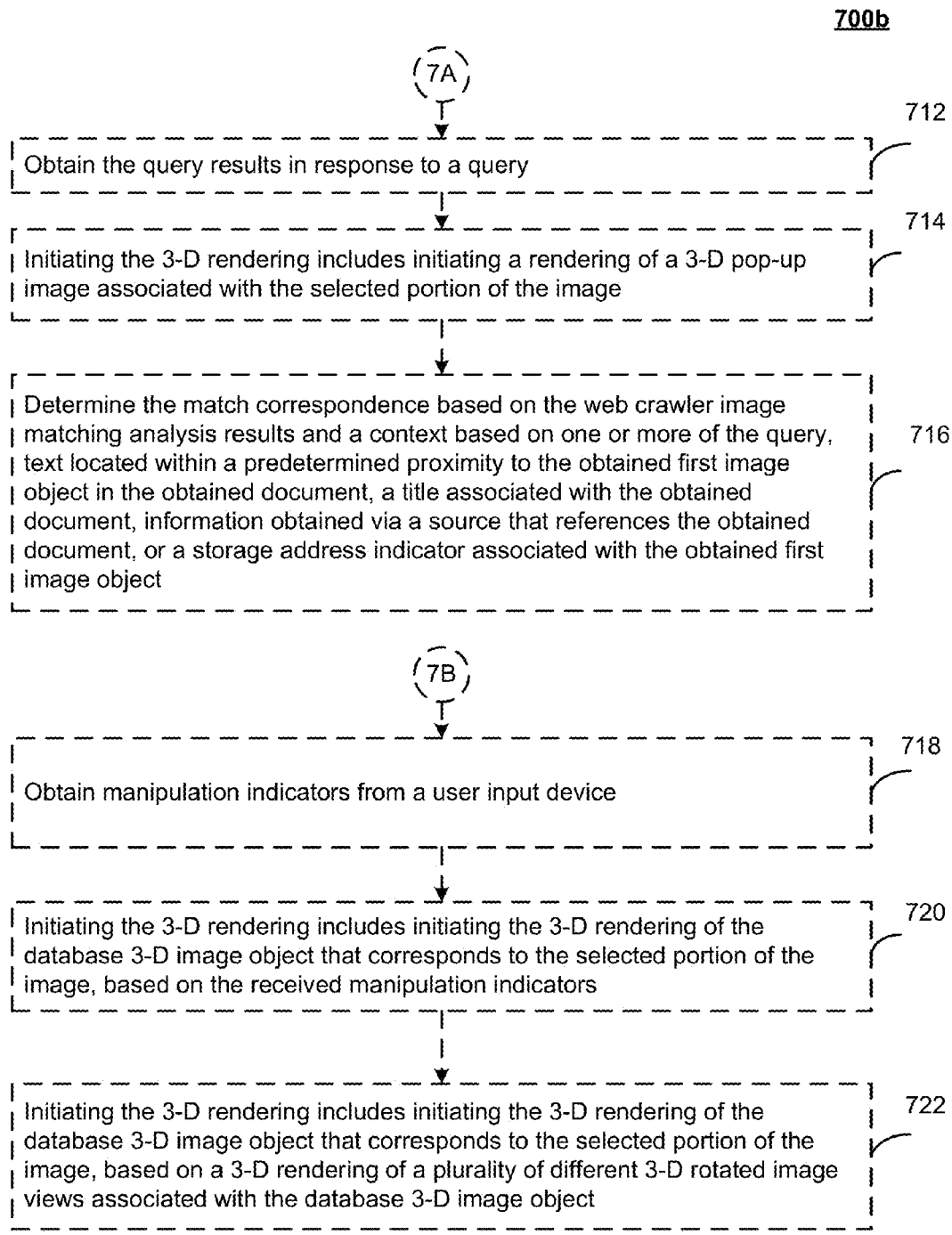
Figure 7C:
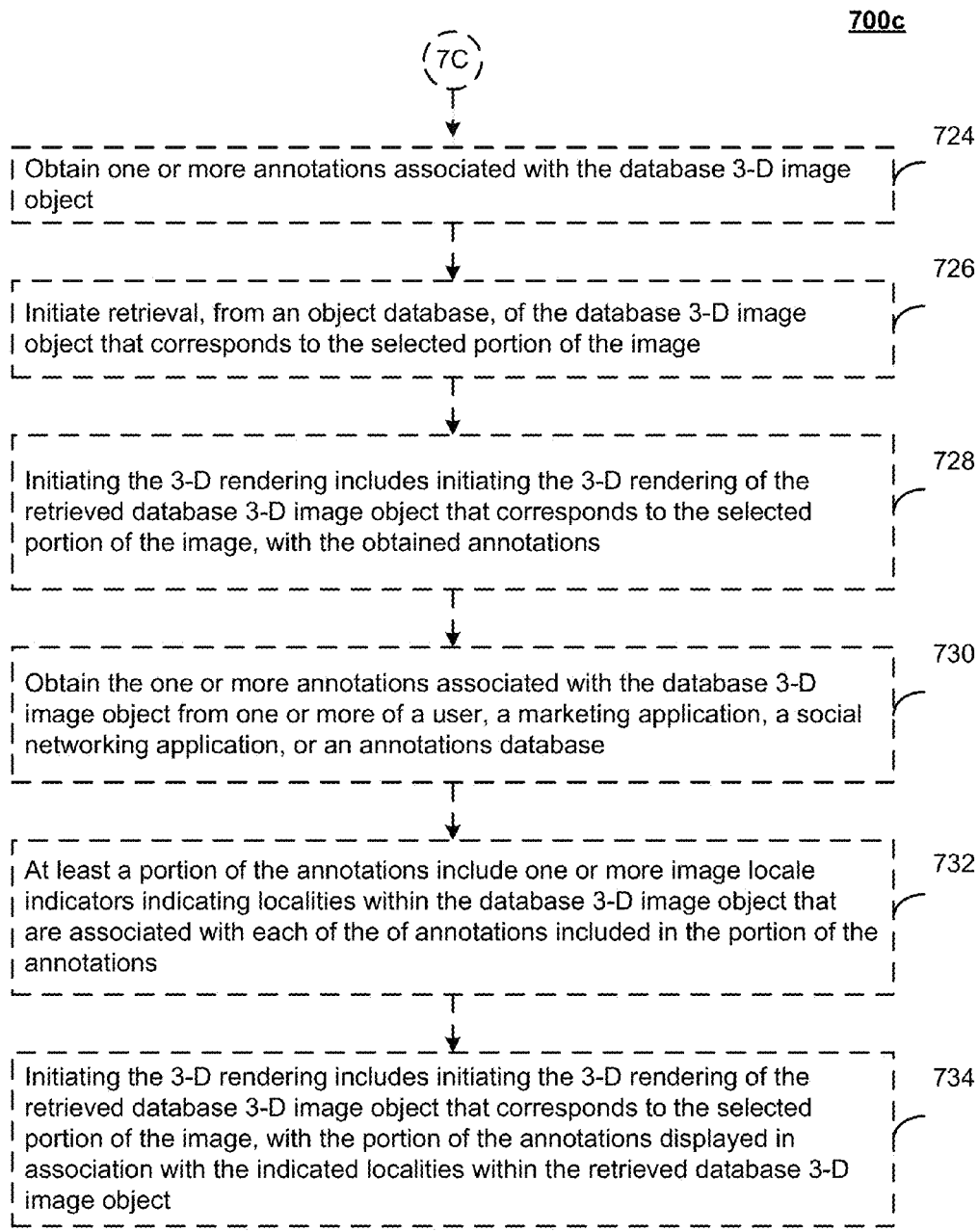

According to an example embodiment, one or more annotations associated with the database 3-D image object may be obtained (724), in the example of FIG. 7c. For example, the annotation component 154 may obtain one or more annotations 156 associated with the database 3-D image object 144, as discussed above.

According to an example embodiment, retrieval, from an object database, of the database 3-D image object that corresponds to the selected portion of the image may be initiated (726). For example, the image object retrieval component 158 may initiate retrieval, from the object database 150, of the database 3-D image object 144 that corresponds to the selected portion of the image 134, as discussed above.

For example, initiating the 3-D rendering may include initiating the 3-D rendering of the retrieved database 3-D image object that corresponds to the selected portion of the image, with the obtained annotations (728). For example, the 3-D rendering component 148 may initiate the 3-D rendering of the retrieved database 3-D image object 144 that corresponds to the selected portion of the image 134, with the obtained annotations 156, as discussed above.

The one or more annotations associated with the database 3-D image object may be obtained from one or more of a user, a marketing application, a social networking application, or an annotations database (730).

At least a portion of the annotations may include one or more image locale indicators indicating localities within the database 3-D image object that are associated with each of the of annotations included in the portion of the annotations (732). For example, at least a portion of the annotations 156 may include one or more image locale indicators 160 indicating localities within the database 3-D image object 144 that are associated with each of the of annotations 156 included in the portion, as discussed above.

According to an example embodiment, initiating the 3-D rendering may include initiating the 3-D rendering of the retrieved database 3-D image object that corresponds to the selected portion of the image, with the portion of the annotations displayed in association with the indicated localities within the retrieved database 3-D image object (734). For example, the 3-D rendering component 148 may initiate the 3-D rendering of the retrieved database 3-D image object 144 that corresponds to the selected portion of the image 134, with the portion of the annotations 156 displayed in association with the indicated localities within the database 3-D image object 144, as discussed above.

Figure 7D:
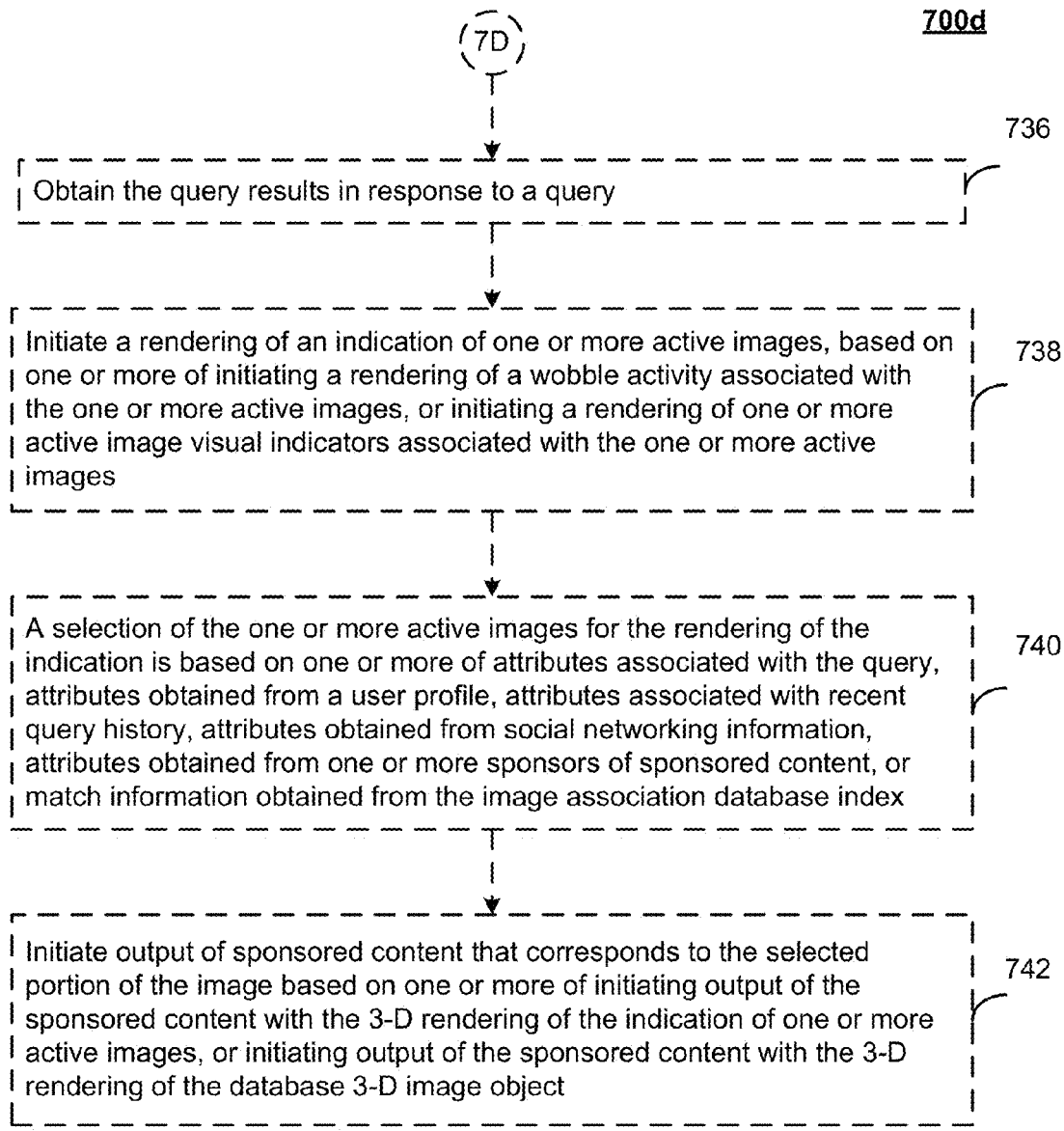

According to an example embodiment, the query results may be obtained in response to a query (736), in the example of FIG. 7*d*. A rendering of an indication of one or more active images may be initiated, based on one or more of initiating a rendering of a wobble activity associated with the one or more active images, or initiating a rendering of one or more active image visual indicators associated with the one or more active images (738). A selection of the one or more active images for the rendering of the indication may be based on one or more of attributes associated with the query, attributes obtained from a user profile, attributes associated with recent query history, attributes obtained from social networking information, attributes obtained from one or more sponsors of sponsored content, or match information obtained from the image association database index (740).

According to an example embodiment, output of sponsored content that corresponds to the selected portion of the image may be initiated based on one or more of initiating output of the sponsored content with the 3-D rendering of the indication of one or more active images, or initiating output of the sponsored content with the 3-D rendering of the database 3-D image object (742). For example, the sponsored content component 182 may initiate output of sponsored content 180 that corresponds to the selected portion of the image 134, as discussed above.

Figure 8A:
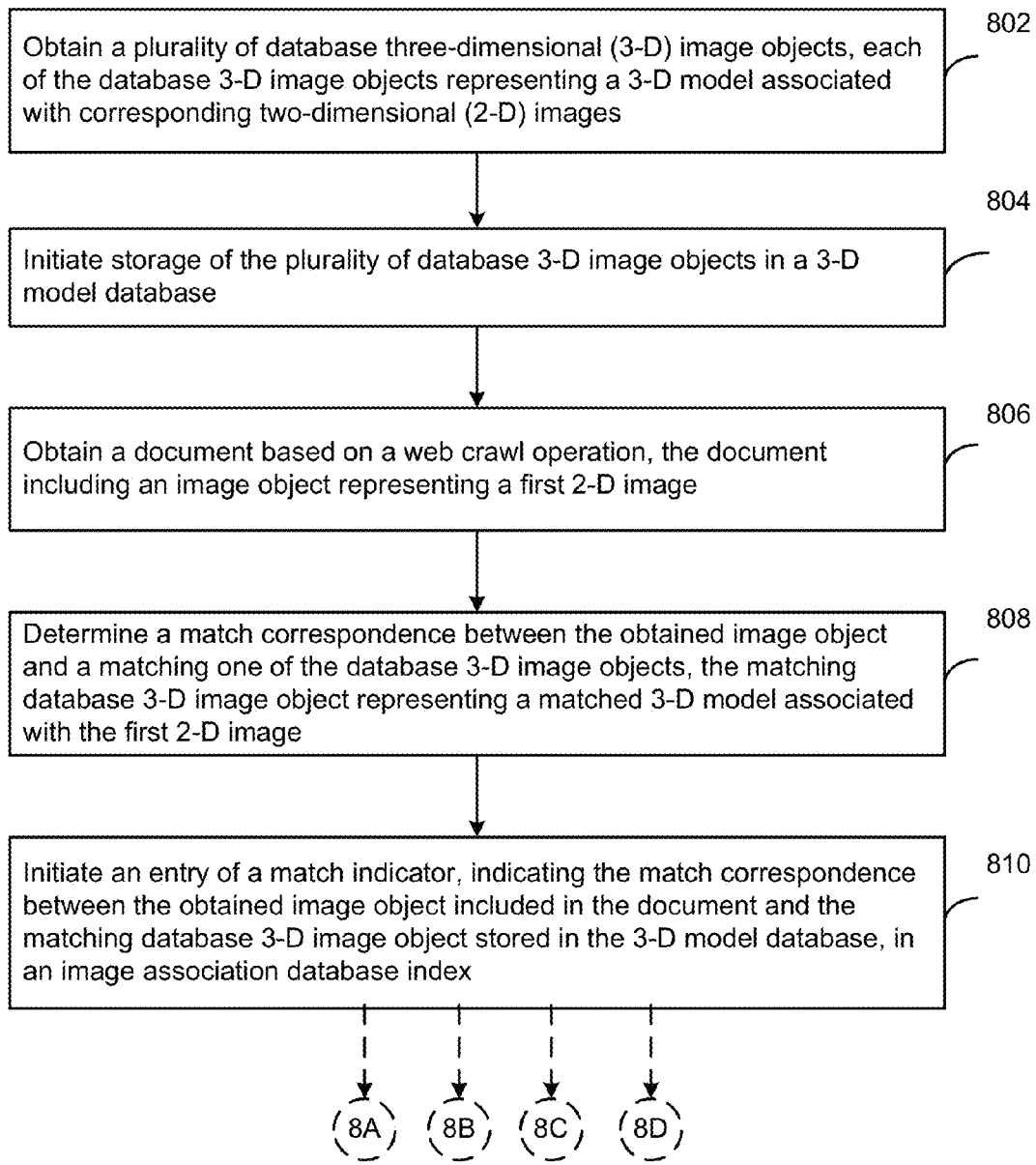
FIG. 8 is a flowchart illustrating example operations of the system of FIG. 2.

FIG. 8 is a flowchart illustrating example operations of the system of FIG. 2, according to example embodiments. In the example of FIG. 8*a*, a plurality of database three-dimensional (3-D) image objects may be obtained, each of the database 3-D image objects representing a 3-D model associated with corresponding two-dimensional (2-D) images (802). For example, the database acquisition component 204 may obtain a plurality of database 3-D image objects 206, as discussed above.

Storage of the plurality of database 3-D image objects in a 3-D model database may be initiated (804). For example, the database storage component 228 may initiate storage, via the device processor 230, of the plurality of database 3-D image objects 206 in the object database 232, as discussed above.

A document may be obtained based on a web crawl operation, the document including an image object representing a first 2-D image (806). For example, the document acquisition component 234 may obtain a document 238 based on a web crawl operation, the document 238 including an image object 240 representing a first 2-D image 208, as discussed above.

A match correspondence between the obtained image object and a matching one of the database 3-D image objects may be determined, the matching database 3-D image object representing a matched 3-D model associated with the first 2-D image (808). For example, the match manager 242 may determine a match correspondence between the obtained image object 240 and a matching one of the database 3-D image objects 206, as discussed above.

An entry of a match indicator, indicating the match correspondence between the obtained image object included in the document and the matching database 3-D image object stored in the 3-D model database, may be initiated in an image association database index (810). For example, the index entry manager 244 may initiate an entry of a match indicator 246, indicating the match correspondence between the obtained image object 240 included in the document 238 and the matching database 3-D image object 206 stored in the object database 232, in the image association database index 248, as discussed above.

Figure 8B:
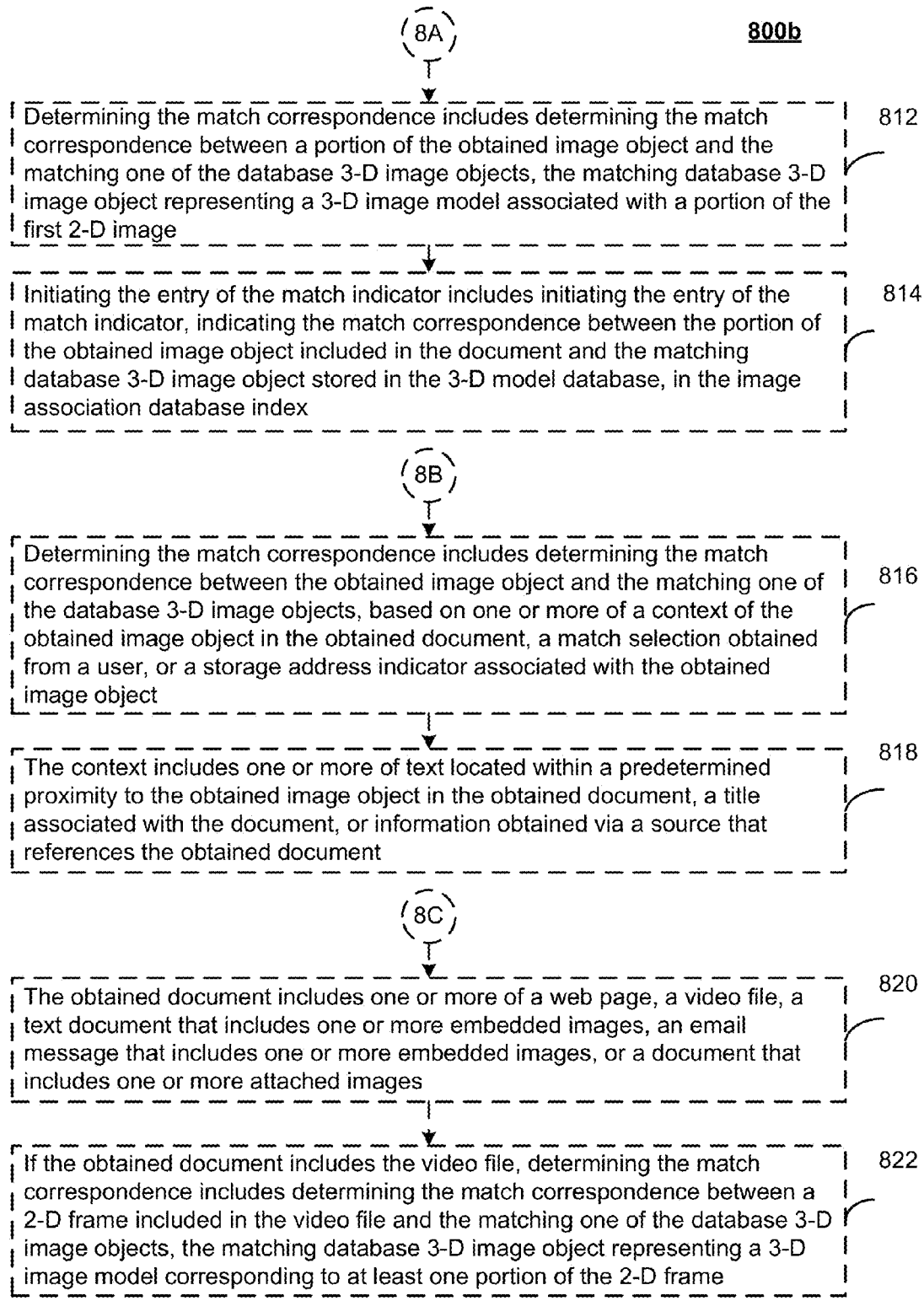

As discussed above, determining the match correspondence may include determining the match correspondence between a portion of the obtained image object and the matching one of the database 3-D image objects, the matching database 3-D image object representing a 3-D image model associated with a portion of the first 2-D image (812), in the example of FIG. 8*b*. Initiating the entry of the match indicator may include initiating the entry of the match indicator, indicating the match correspondence between the portion of the obtained image object included in the document and the matching database 3-D image object stored in the 3-D model database, in the image association database index (814).

For example, determining the match correspondence may include determining the match correspondence between the obtained image object and the matching one of the database 3-D image objects, based on one or more of a context of the obtained image object in the obtained document, a match selection obtained from a user, or a storage address indicator associated with the obtained image object (816).

For example, the context may include one or more of text located within a predetermined proximity to the obtained image object in the obtained document, a title associated with the document, or information obtained via a source that references the obtained document (818).

For example, the obtained document may include one or more of a web page, a video file, a text document that includes one or more embedded images, an email message that includes one or more embedded images, or a document that includes one or more attached images (820). According to an example embodiment, if the obtained document includes the video file, determining the match correspondence may include determining the match correspondence between a 2-D frame included in the video file and the matching one of the database 3-D image objects, the matching database 3-D image object representing a 3-D image model corresponding to at least one portion of the 2-D frame (822).

Figure 8C:
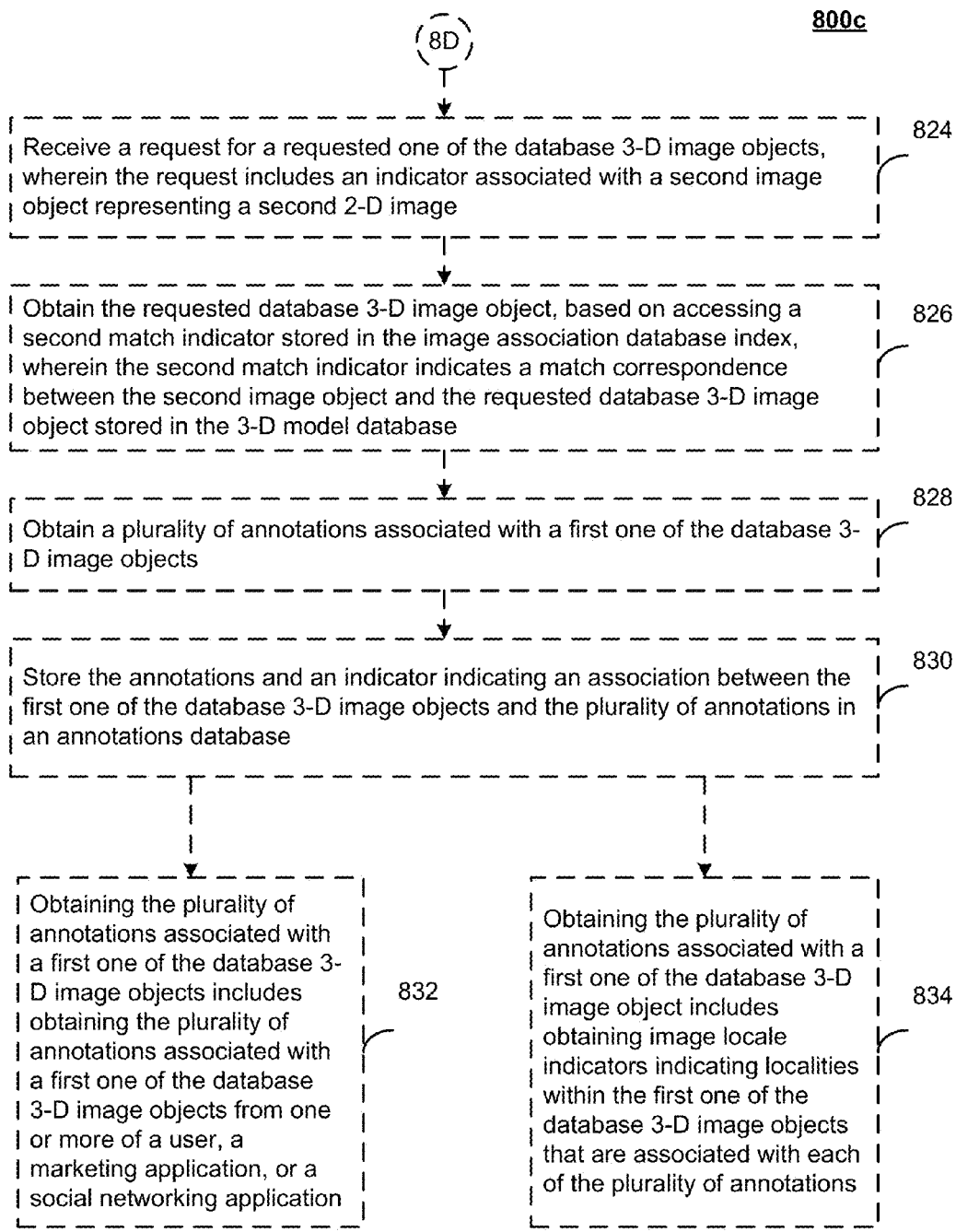

According to an example embodiment, a request for a requested one of the database 3-D image objects may be received, wherein the request may include an indicator associated with a second image object representing a second 2-D image (824), in the example of FIG. 8*c*. For example, the 3-D object request component 260 may be configured to receive a request 262 for a requested one of the database 3-D image objects 206, as discussed above.

According to an example embodiment, the requested database 3-D image object may be obtained, based on accessing a second match indicator stored in the image association database index, wherein the second match indicator may indicate a match correspondence between the second image object and the requested database 3-D image object stored in the 3-D model database (826). For example, the 3-D object request component 260 may obtain the requested database 3-D image object 206, as discussed above.

A plurality of annotations associated with a first one of the database 3-D image objects may be obtained (828). For example, the annotation acquisition component 264 may be configured to obtain a plurality of annotations 266 associated with a first one of the database 3-D image objects 206, as discussed above. For example, the annotations and an indicator indicating an association between the first one of the database 3-D image objects and the plurality of annotations may be stored in an annotations database (830). For example, the annotation acquisition component 264 may store the annotations 266 and an indicator indicating an association between the first one of the database 3-D image objects 206 and the plurality of annotations 266 in the annotations database 268, as discussed above.

For example, obtaining the plurality of annotations associated with a first one of the database 3-D image objects may include obtaining the plurality of annotations associated with a first one of the database 3-D image objects from one or more of a user, a marketing application, or a social networking application (832).

For example, obtaining the plurality of annotations associated with a first one of the database 3-D image objects may include obtaining image locale indicators indicating localities within the first one of the database 3-D image objects that are associated with each of the plurality of annotations (834).

Figure 9A:
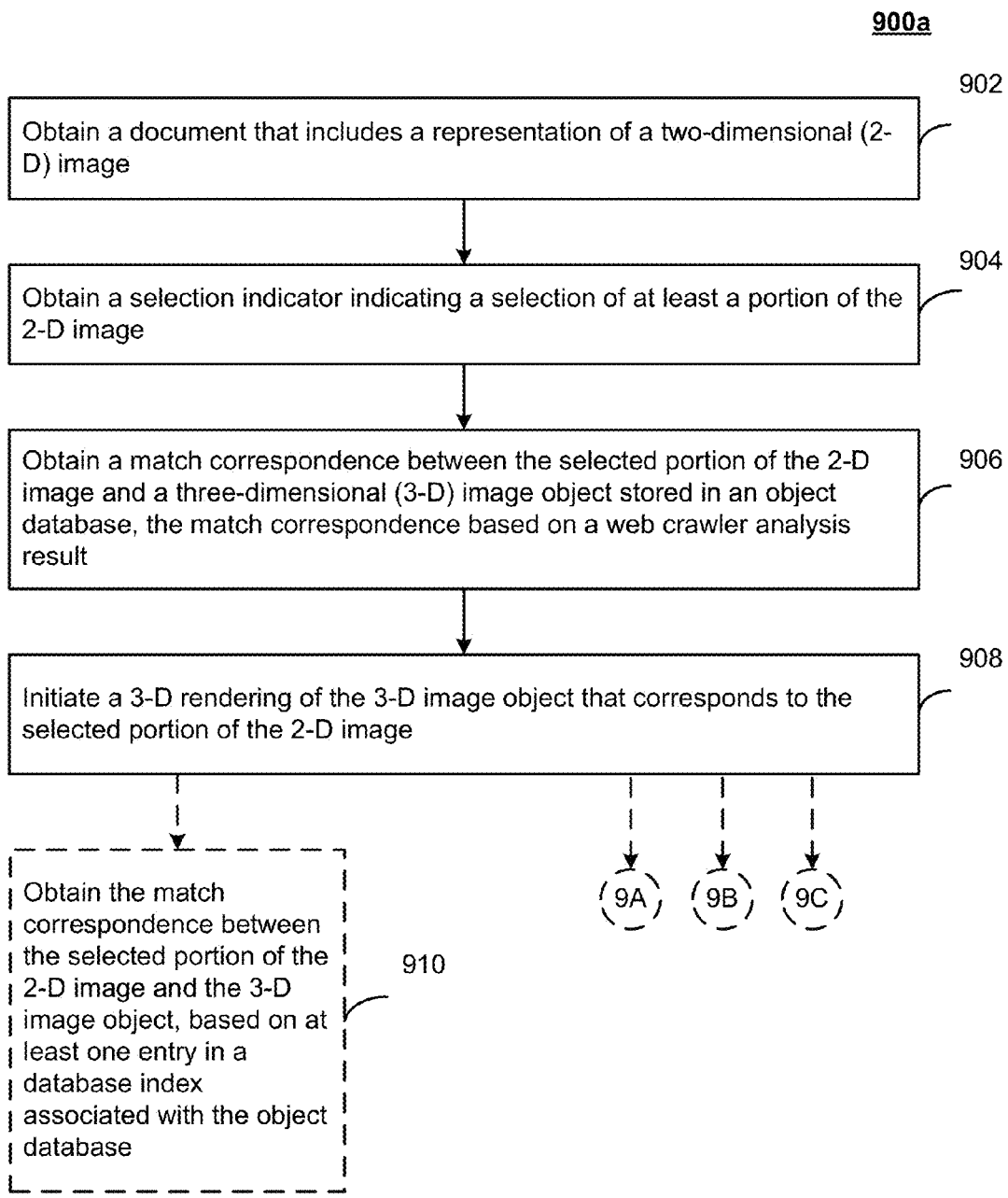
FIG. 9 is a flowchart illustrating example operations of the system of FIG. 1.

FIG. 9 is a flowchart illustrating example operations of the system of FIG. 1, according to example embodiments. In the example of FIG. 9*a*, a document that includes a two-dimensional (2-D) image may be obtained (902). For example, the document acquisition component 128 may obtain the document 130, as discussed above. A selection indicator indicating a selection of at least a portion of the 2-D image may be obtained (904). For example, the selector component 136 may obtain the selection indicator 138 indicating a selection of at least a portion of the image 134, as discussed above.

A match correspondence between the selected portion of the 2-D image and a three-dimensional (3-D) image object stored in an object database may be determined, the match correspondence based on a web crawler analysis result (906). For example, the image matching component 140 may determine a match correspondence between the selected portion of the image 134 and a database 3-D image object 144, the match correspondence based on a web crawler analysis result, as discussed above.

A three-dimensional (3-D) rendering of the 3-D image object that corresponds to the selected portion of the 2-D image may be initiated (908). For example, the 3-D rendering component 148 may initiate a 3-D rendering of the database 3-D image object 144 that corresponds to the selected portion of the image 134, as discussed above.

According to an example embodiment, the document acquisition component 128 may obtain the document 130 based on sources other than search queries. Thus, the 3-D rendering component 148 may initiate the 3-D rendering of the database 3-D image object 144 based on documents obtained from any source (i.e., not limited to search engine results). For example, a user may navigate to a marketplace such as AMAZON, and may experience 3-D renderings of database 3-D image objects 144 that may be associated with viewed AMAZON products.

According to an example embodiment, the match correspondence between the selected portion of the 2-D image and the 3-D image object may be determined, based on at least one entry in a database index associated with the object database (910).

For example, display of annotation information associated with the 3-D image object may be initiated (912), in the example of FIG. 9*b*. For example, the 3-D rendering component 148 may initiate the 3-D rendering of the database 3-D image object 144 that corresponds to the selected portion of the image 134, with the annotations 156, as discussed above.

For example, the annotation information may include one or more of advertising information, descriptive information associated with the 3-D image object, or social media information associated with the obtained document (914). For example, the obtained document may include one or more of a web page, a video file, a text document that includes one or more embedded images, an email message that includes one or more embedded images, or a document that includes one or more attached images (916). For example, if the obtained document includes the video file, the selection of at least a portion of the 2-D image may include a selection of at least a portion of a frame image of the video file (918).

An animated display of the 2-D image may be initiated, based on one or more of a determination that at least a portion of the 2-D image matches the 3-D image object stored in the object database, attributes associated with the query, attributes obtained from a user profile, attributes associated with recent query history, attributes obtained from social networking information, or attributes obtained from one or more sponsors of sponsored content (920). For example, the animation component 166 may initiate an animated display of the 2-D image 134, as discussed above.

According to an example embodiment, the 3-D rendering of the 3-D image object that corresponds to the selected portion of the 2-D image may be initiated via a browser plug-in included in a user browser, based on one or more of initiating a rendering of a 3-D pop-up image associated with the selected portion of the 2-D image, initiating a 3-D rendering of a plurality of different 3-D rotated image views associated with the 3-D image object that corresponds to the selected portion of the 2-D image, or initiating a 3-D rendering of the 3-D image object that corresponds to the selected portion of the 2-D image, based on manipulation indicators obtained from a user input device (922).

One skilled in the art of data processing will understand that there are many ways of browsing 3-D objects in documents, without departing from the spirit of the discussion herein.

Customer privacy and confidentiality have been ongoing considerations in data processing environments for many years. Thus, example techniques for using 3-D object browsing in documents may use user input and/or data provided by users who have provided permission via one or more subscription agreements (e.g., "Terms of Service" (TOS) agreements) with associated applications or services associated with browsing. For example, users may provide consent to have their input/data transmitted and stored on devices, though it may be explicitly indicated (e.g., via a user accepted text agreement) that each party may control how transmission and/or storage occurs, and what level or duration of storage may be maintained, if any.

Implementations of the various techniques described herein may be implemented in digital electronic circuitry, or in computer hardware, firmware, software, or in combinations of them (e.g., an apparatus configured to execute instructions to perform various functionality). Implementations may be implemented as a computer program embodied in a propagated signal or, alternatively, as a computer program product, i.e., a computer program tangibly embodied in an information carrier, e.g., in a machine usable or tangible machine readable storage device (e.g., a magnetic or digital medium such as a Universal Serial Bus (USB) storage device, a tape, hard disk drive, compact disk, digital video disk (DVD), etc.), for execution by, or to control the operation of, a data processing apparatus, e.g., a programmable processor, a computer, or multiple computers. A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
    one or more processors;
    at least one tangible computer-readable storage medium storing instructions executable by the one or more processors, the executable instructions configured to cause at least one data processing apparatus to:
    obtain query results;
    obtain a document that includes a first image object representing an image, based on the obtained query results;
    obtain a selection indicator representing a selection of at least a portion of the image;
    determine a match correspondence between the selected portion of the image and a database three-dimensional (3-D) image object, based on web crawler image matching analysis results previously stored in an image association database index; and
    initiate a 3-D rendering of the database 3-D image object that corresponds to the selected portion of the image.

2. The system of claim 1, wherein the executable instructions are configured to cause the at least one data processing apparatus to:
    obtain the query results in response to a query, wherein initiating the 3-D rendering includes initiating a rendering of a 3-D pop-up image associated with the selected portion of the image, wherein the match correspondence is determined based on the web crawler image matching analysis results and a context based on one or more of:
  the query,
  text located within a predetermined proximity to the obtained first image object in the obtained document,
  a title associated with the obtained document,
  information obtained via a source that references the obtained document, or
  a storage address indicator associated with the obtained first image object.

3. The system of claim 1, wherein the executable instructions are configured to cause the at least one data processing apparatus to:
  obtain one or more annotations associated with the database 3-D image object; and initiate retrieval, from an object database, of the database 3-D image object that corresponds to the selected portion of the image, wherein
  initiating the 3-D rendering includes initiating the 3-D rendering of the retrieved database 3-D image object that corresponds to the selected portion of the image, with the obtained annotations.

4. The system of claim 3, wherein the executable instructions are configured to cause the at least one data processing apparatus to:
  obtain the one or more annotations associated with the database 3-D image object from one or more of:
    a user,
    a marketing application,
    a social networking application, or
    an annotations database, wherein
  at least a portion of the annotations include one or more image locale indicators indicating localities within the database 3-D image object that are associated with each of the of annotations included in the portion of the annotations, and wherein
  initiating the 3-D rendering includes initiating the 3-D rendering of the retrieved database 3-D image object that corresponds to the selected portion of the image, with the portion of the annotations displayed in association with the indicated localities within the retrieved database 3-D image object.

5. The system of claim 1, wherein the executable instructions are configured to cause the at least one data processing apparatus to:
  obtain manipulation indicators from a user input device, wherein:
  initiating the 3-D rendering includes initiating the 3-D rendering of the database 3-D image object that corresponds to the selected portion of the image, based on the received manipulation indicators, and wherein:
  initiating the 3-D rendering includes initiating the 3-D rendering of the database 3-D image object that corresponds to the selected portion of the image, based on a 3-D rendering of a plurality of different 3-D rotated image views associated with the database 3-D image object.

6. The system of claim 1, wherein the executable instructions are configured to cause the at least one data processing apparatus to:
  obtain the query results in response to a query;
  initiate a rendering of an indication of one or more active images, based on one or more of:
    initiating a rendering of a wobble activity associated with the one or more active images, or
    initiating a rendering of one or more active image visual indicators associated with the one or more active images, wherein
  a selection of the one or more active images for the rendering of the indication is based on one or more of:
    attributes associated with the query,
    attributes obtained from a user profile,
    attributes associated with recent query history,
    attributes obtained from social networking information,
    attributes obtained from one or more sponsors of sponsored content, or
    match information obtained from the image association database index; and
  the executable instructions are configured to cause the at least one data processing apparatus to initiate output of sponsored content that corresponds to the selected portion of the image based on one or more of:
    initiating output of the sponsored content with the 3-D rendering of the indication of one or more active images, or
    initiating output of the sponsored content with the 3-D rendering of the database 3-D image object.

7. A method comprising:
  obtaining a plurality of database three-dimensional (3-D) image objects, each of the database 3-D image objects representing a 3-D model associated with corresponding two-dimensional (2-D) images;
  initiating storage, via a device processor, of the plurality of database 3-D image objects in a 3-D model database;
  obtaining a document based on a web crawl operation, the document including an image object representing a first 2-D image;
  determining a match correspondence between the obtained image object and a matching one of the database 3-D image objects, the matching database 3-D image object representing a matched 3-D model associated with the first 2-D image; and
  initiating an entry of a match indicator, indicating the match correspondence between the obtained image object included in the document and the matching database 3-D image object stored in the 3-D model database, in an image association database index.

8. The method of claim 7, wherein:
  determining the match correspondence includes determining the match correspondence between a portion of the obtained image object and the matching one of the database 3-D image objects, the matching database 3-D image object representing a 3-D image model associated with a portion of the first 2-D image, wherein
  initiating the entry of the match indicator includes initiating the entry of the match indicator, indicating the match correspondence between the portion of the obtained image object included in the document and the matching database 3-D image object stored in the 3-D model database, in the image association database index.

9. The method of claim 7, wherein:
  determining the match correspondence includes determining the match correspondence between the obtained image object and the matching one of the database 3-D image objects, based on one or more of:
    a context of the obtained image object in the obtained document,
    a match selection obtained from a user, or
    a storage address indicator associated with the obtained image object.

10. The method of claim 9, wherein:
  the context includes one or more of:

text located within a predetermined proximity to the obtained image object in the obtained document, a title associated with the obtained document, or information obtained via a source that references the obtained document.

11. The method of claim 7, wherein:

the obtained document includes one or more of:
- a web page,
- a video file,
- a text document that includes one or more embedded images,
- an email message that includes one or more embedded images, or
- a document that includes one or more attached images, wherein if the obtained document includes the video file, determining the match correspondence includes determining the match correspondence between a 2-D frame included in the video file and the matching one of the database 3-D image objects, the matching database 3-D image object representing a 3-D image model corresponding to at least one portion of the 2-D frame.

12. The method of claim 7, further comprising:

receiving a request for a requested one of the database 3-D image objects, wherein the request includes an indicator associated with a second image object representing a second 2-D image; and obtaining the requested database 3-D image object, based on accessing a second match indicator stored in the image association database index, wherein the second match indicator indicates a match correspondence between the second image object and the requested database 3-D image object stored in the 3-D model database.

13. The method of claim 7, further comprising:

obtaining a plurality of annotations associated with a first one of the database 3-D image objects; and storing the annotations and an indicator indicating an association between the first one of the database 3-D image objects and the plurality of annotations in an annotations database.

14. The method of claim 13, wherein:

obtaining the plurality of annotations associated with a first one of the database 3-D image objects includes:
  obtaining the plurality of annotations associated with a first one of the database 3-D image objects from one or more of:
    a user,
    a marketing application, or
    a social networking application.

15. The method of claim 13, wherein:

obtaining the plurality of annotations associated with a first one of the database 3-D image objects includes:
  obtaining image locale indicators indicating localities within the first one of the database 3-D image objects that are associated with each of the plurality of annotations.

16. A computer program product comprising a computer-readable storage device storing executable code that, when executed, causes at least one data processing apparatus to:

obtain a document that includes a representation of a two-dimensional (2-D) image;

obtain a selection indicator indicating a selection of at least a portion of the 2-D image;

obtain, via a device processor, a match correspondence between the selected portion of the 2-D image and a three-dimensional (3-D) image object stored in an object database, the match correspondence based on a web crawler analysis result; and initiate a 3-D rendering of the 3-D image object that corresponds to the selected portion of the 2-D image.

17. The computer program product of claim 16, wherein the executable code, when executed, causes the at least one data processing apparatus to:

obtain, via the device processor, the match correspondence between the selected portion of the 2-D image and the 3-D image object, based on at least one entry in a database index associated with the object database.

18. The computer program product of claim 16, wherein the executable code, when executed, causes the at least one data processing apparatus to:

initiate display of annotation information associated with the 3-D image object, wherein the annotation information includes one or more of:
  advertising information,
  descriptive information associated with the 3-D image object, or
  social media information associated with the obtained document, wherein:

the obtained document includes one or more of:
  a web page,
  a video file,
  a text document that includes one or more embedded images,
  an email message that includes one or more embedded images, or
  a document that includes one or more attached images, wherein if the obtained document includes the video file, the selection of at least a portion of the 2-D image includes a selection of at least a portion of a frame image of the video file.

19. The computer program product of claim 16, wherein the executable code, when executed, causes the at least one data processing apparatus to:

initiate an animated display of the 2-D image, based on one or more of:
  a determination that at least a portion of the 2-D image matches the 3-D image object stored in the object database,
  attributes associated with the query,
  attributes obtained from a user profile,
  attributes associated with recent query history,
  attributes obtained from social networking information, or
  attributes obtained from one or more sponsors of sponsored content.

20. The computer program product of claim 16, wherein the executable code, when executed, causes the at least one data processing apparatus to:

initiate the 3-D rendering of the 3-D image object that corresponds to the selected portion of the 2-D image via a browser plug-in included in a user browser, based on one or more of:
  initiating a rendering of a 3-D pop-up image associated with the selected portion of the 2-D image,
  initiating a 3-D rendering of a plurality of different 3-D rotated image views associated with the 3-D image object that corresponds to the selected portion of the 2-D image, or initiating a 3-D rendering of the 3-D image object that corresponds to the selected portion of the 2-D image, based on manipulation indicators obtained from a user input device.

* * * * *